US011887171B2

(12) United States Patent
Bango et al.

(10) Patent No.: US 11,887,171 B2
(45) Date of Patent: Jan. 30, 2024

(54) METHOD FOR AI AND CLOUD NETWORK ENHANCED ELECTRIC SUBSCRIBER CONTROL OF BILLING AND SYSTEM LOADS, WITH CONTINGENCY BACKUP

(71) Applicants: Joseph J. Bango, New Haven, CT (US); Michael E. Dziekan, Bethany, CT (US)

(72) Inventors: Joseph J. Bango, New Haven, CT (US); Michael E. Dziekan, Bethany, CT (US)

( * ) Notice: Subject to any disclaimer, the term of this patent is extended or adjusted under 35 U.S.C. 154(b) by 186 days.

(21) Appl. No.: 17/195,100

(22) Filed: Mar. 8, 2021

(65) Prior Publication Data
US 2021/0192587 A1 Jun. 24, 2021

Related U.S. Application Data

(63) Continuation-in-part of application No. 16/869,047, filed on May 7, 2020, now Pat. No. 10,943,455, (Continued)

(51) Int. Cl.
G06Q 50/06 (2012.01)
H04L 67/10 (2022.01)
G06Q 30/04 (2012.01)

(52) U.S. Cl.
CPC ............ *G06Q 30/04* (2013.01); *G06Q 50/06* (2013.01); *H04L 67/10* (2013.01)

(58) Field of Classification Search
CPC ........ G08B 19/00; G08B 7/06; G08B 21/182; G08B 25/10; H04W 4/90; H04W 4/021
(Continued)

(56) References Cited

U.S. PATENT DOCUMENTS

2009/0289637 A1* 11/2009 Radtke ................. G01R 31/088
324/629
2011/0251807 A1* 10/2011 Rada ........................ G01D 4/00
702/61

* cited by examiner

*Primary Examiner* — Ted M Wang
(74) *Attorney, Agent, or Firm* — Michael A. Blake

(57) ABSTRACT

A system for localized subscriber control of electric provider billing comprising: a digital assistant in communication with powerline sensors, the powerline sensors configured to detect weather, natural disaster, or other event that compromises the electric grid in a given predetermined region, a smart utility box in operational communication with a subscriber's utility connection and in communication with the digital assistant, wherein the smart utility box is configured to disconnect from a utility and stop incurring charges from the utility if the smart utility box determines that utility prices may exceed a threshold value. A system of reCAPTCHA comprising: a series of images showing ice on a powerline, or ice on a powerline, fire on or near a powerline, or other condition that can lead to failure of a powerline; and a screen to allow users to select the image showing ice on a powerline, or ice on a powerline, fire on or near a powerline, or other condition that can lead to failure of a powerline which will assist a power system AI deep learning. A power transmission line monitor comprising a non-transitory computer-readable medium, where the medium includes a set of instructions stored thereon that when accessed by a processor enable the processor to perform a method of geolocation awareness for a digital assistant, the method comprising: configuring the power transmission line monitor to be in communication with a network; configuring the power transmission line monitor to be in communication with a remote server via the network; configuring the power transmission line monitor to be in communication with a cloud computing system via the remote server; configuring the power transmission line monitor to be in communication with the
(Continued)

internet such that the present cost of electricity for a given user defined geographical service area is obtained, and the current cost of electric service in the predefined geographical location reported, preferably using bluetooth, email, or a digital assistant located in a residence or a business via the cloud computing system; monitoring temperature, icing of the powerline, electric current in a power transmission line, and three-axis shock above a threshold level, transmitting the temperature, icing condition, electric current, and three-axis shock information to the remote server.

5 Claims, 31 Drawing Sheets

Related U.S. Application Data which is a continuation-in-part of application No. 15/822,511, filed on Nov. 27, 2017, now Pat. No. 10,189,394, which is a continuation-in-part of application No. 14/756,193, filed on Aug. 14, 2015, now Pat. No. 9,970,975.

(60) Provisional application No. 62/070,105, filed on Aug. 14, 2014.

(58) Field of Classification Search
USPC .......................................................... 340/635
See application file for complete search history.

METHOD FOR AI AND CLOUD NETWORK ENHANCED ELECTRIC SUBSCRIBER CONTROL OF BILLING AND SYSTEM LOADS, WITH CONTINGENCY BACKUP

CROSS-REFERENCES

This patent application is a continuation-in-part of patent application Ser. No. 16/869,047, by Joseph J. Bango and Michael E. Dziekan, entitled "System for Geolocation Awareness for Voice Activated Digital Assistants", filed on May 7, 2020, the entire contents of which are fully incorporated by reference herein. patent application Ser. No. 16/869,047 is a continuation-in-part of patent application Ser. No. 15/882,133, by Joseph J. Bango and Michael Dziekan, entitled "System for the Standoff Detection of Power Line Hazards and Means for Standoff Data Collection, Storage, and Dissemination", filed on Jan. 29, 2018, the entire contents of which are fully incorporated by reference herein. U.S. Pat. No. 15,882,133 is a continuation-in-part of U.S. Pat. No. 9,970,975, by Joseph J. Bango and Michael Dziekan, entitled "System for the standoff detection of power line hazards", issued on May 15, 2018, the entire contents of which are fully incorporated by reference herein. U.S. Pat. No. 9,970,975 claims the benefit of provisional patent application No. 62/070,105, by Joseph J. Bango and Michael E. Dziekan, entitled "Standoff detection of power line hazards", filed on Aug. 14, 2014, and which provisional application is fully incorporated by reference herein.

FIELD OF INVENTION

This invention relates to the field of systems for the standoff detection of power line hazards and for systems that send a signal to a responsible repair center to inform the center of the location of the defect in the line, including icing. This invention also relates to the collection of visual, audible, radio frequency, and other data for analysis, storage, and dissemination. This invention relates to market price of electricity and the dissemination of such information to electric subscribers for decision analysis on subscriber electric load choice. This invention relates to a method for localized subscriber control of electric provider billing.

BACKGROUND

There is currently a problem of providing a signal to a responsible repair center that will characterize the type of cable or power line that is down or about to become damaged to enable a responsible repair center to accurately evaluate the defect and determine what repair service is necessary, if any. Often times there are unnecessary electric utility and first responder intervention in the event of a downed electrical cable that may not present a voltage hazard. Utilities are besieged by calls of downed wires, which may in fact be only telephone, cable TV, or other non-hazardous electrical or even fiber optic lines. Nevertheless, power utilities must consider all downed lines as live electrical carriers. Responding as such taxes a utilities ability to effect rapid overall system damage assessment and prolongs system restoration. There is currently no widespread downed line status indicator that will help the public near the defect to avoid danger and assist the responsible repair center in analyzing the defect so as to increase the ability of the responsible repair center to repair lines damaged due to an unplanned natural calamity or other incident. There is no known system in widespread use that provides a warning as to a whether a power line is live, whether this represents high voltage before a distribution transformer or line voltage from a distribution transformer. There is no known system in widespread use that provides a signal or signals that indicate if a power line is experiencing a load due to arcing or a coronal discharge. There is also no known system in use that provides a warning to the electric subscriber to allow said subscriber a means to adjust their home or system load depending upon the cost of the electric provider rates per Kw/hr.

Thus there is a need for a method for localized subscriber control of electric provider billing that overcomes the above listed and other disadvantages.

SUMMARY OF INVENTION

The invention relates to a system for localized subscriber control of electric provider billing comprising: a digital assistant in communication with powerline sensors, the powerline sensors configured to detect weather, natural disaster, or other event that compromises the electric grid in a given predetermined region, a smart utility box in operational communication with a subscriber's utility connection and in communication with the digital assistant, wherein the smart utility box is configured to disconnect from a utility and stop incurring charges from the utility if the smart utility box determines that utility prices may exceed a threshold value.

The invention also relates to a system of reCAPTCHA comprising: a series of images showing ice on a powerline, or ice on a powerline, fire on or near a powerline, or other condition that can lead to failure of a powerline; and a screen to allow users to select the image showing ice on a powerline, or ice on a powerline, fire on or near a powerline, or other condition that can lead to failure of a powerline which will assist a power system AI deep learning.

The disclosed invention relates to a system for geolocation awareness for voice activated digital assistants comprising: a plurality of digital assistants in communication with a network; a cloud computing system in communication with the plurality of digital assistants via the network; a power transmission line monitor in communication with the network, the power transmission line monitor configured to monitor temperature, electric current in the power transmission line, and three-axis shock above a threshold level; a remote server in communication with the power transmission line monitor via the network and in communication with the cloud computing system via the network, the remote server configured to determine if the monitored temperature indicates an emergency event, and configured to determine if the monitored electric current indicates an emergency event, and configured to determine if the monitored three-axis shock indicates an emergency event, the remote server further configured to transmit to the cloud computing system the type and location of an indicated emergency event; and where the cloud computing system is configured to instruct the digital assistants within a predetermined distance from the emergency event to audibly alert about the emergency event for a predetermined time period.

The invention also relates to a digital assistant comprising a non-transitory computer-readable medium, where the medium includes a set of instructions stored thereon that when accessed by a processor enable the processor to perform a method of geolocation awareness for the digital assistant, the method comprising: configuring the digital assistant to be in communication with a network; configuring the digital assistant to be in communication with a cloud computing system via the network; configuring the digital assistant to be in communication with a remote server via the cloud computing system; configuring the digital assistant to be in communication with a power transmission line monitor via the remote server; receiving information from the cloud computing system that an emergency event is detected by the power transmission line monitor; issuing an emergency audible alert by the digital assistant if the digital assistant is within a predetermined distance of the emergency event.

In addition, the invention relates to a power transmission line monitor comprising a non-transitory computer-readable medium, where the medium includes a set of instructions stored thereon that when accessed by a processor enable the processor to perform a method of geolocation awareness for a digital assistant, the method comprising: configuring the power transmission line monitor to be in communication with a network; configuring the power transmission line monitor to be in communication with a remote server via the network; configuring the power transmission line monitor to be in communication with a cloud computing system via the remote server; configuring the power transmission line monitor to be in communication with a digital assistant located in a residence or a business via the cloud computing system; monitoring temperature, electric current in a power transmission line, and three-axis shock above a threshold level, transmitting the temperature, electric current, and three-axis shock information to the remote server.

The invention discloses a method by which the electric consumer-user can select at any time to disconnect or reduce electric service purchase, or select a means disclosed by the invention whereby automatic load reduction is initiated on behalf of the consumer in response to predefined thresholds of electric market rates, whether they be wholesale or retail. Some electric utilities generate all the electricity they sell using just the power plants they own. Other utilities purchase electricity directly from other utilities, power marketers, and independent power producers or from a wholesale market organized by a regional transmission reliability organization.

The disclose invention describes a means by which the consumer-subscriber's power utility meter includes a means of bluetooth, smart or digital assistant, and internet connectivity such that, the current electric utility bill data is transmitted to the consumer-subscriber via bluetooth and email, based on actual kilowatt-hour use and the cost per kilowatt-hour at that moment of reporting, including consumer billing data inclusive to that time.

DETAILED DESCRIPTION OF INVENTION

Figure 1:
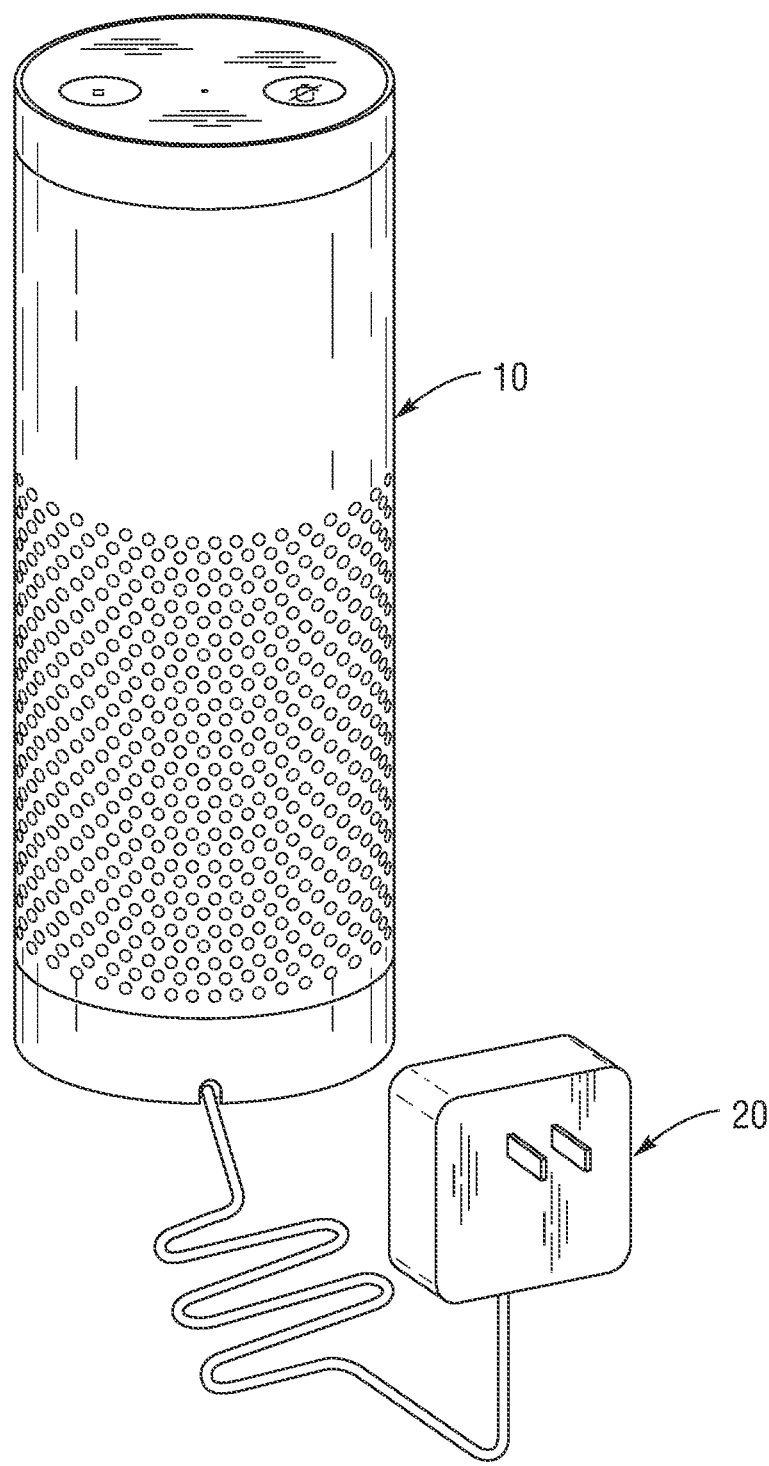
FIG. 1 is a perspective view of a digital assistant.

It has been a dream of computer scientists since the time of Alan Turing to create a natural speech interface with a computer, so a user can only speak a question or command instead of physically typing in that information.

There are several commercially available Wi-Fi connected, voice activated digital assistants on the market, such as Amazons Alexa, Amazons Dot, Google Home, and Apple's SmartPad. These audio digital assistants can receive local weather information determined by a person's general location, and not necessarily a person's specific location. For example, a user asks Alexa what the outside temperature is, and a response is given from Alexa. The temperature information is generally reported by a local airport or a designated climate monitoring station within a certain proximity to the user. The closer the user is to the airport or climate monitoring station, the more accurate the temperature reported by Alexa will be. Unless the user has an outdoor wireless weather station, the specific local weather will not be exact but will be within a range of plus or minus several degrees—since the actual weather data being reported could be up to ten or more miles away. It is easily understood because how many times have we stepped outside of our home where the temperature is hot and humid, while just a few miles down the road at a friend's house, a cooler, less humid climate is encountered. In addition, the user may wish to inquire about local conditions near the user's home, such as if there is traffic congestion, or if weather conditions might impact the delivery of services to the user's home. At present, absent the requisite sensors, the local conditions may not reflect service disruption or potential service disruption miles away from the users home.

With the Amazon Alexa, a user can input specific location data into the app on their smartphone so that the Alexa "knows" where the point of reference is. As an example, a user can add their work destination to the app on their smartphone. The smartphone communicates information to the Alexa and when the user asks how traffic is, the Alexa knows that the question pertains to the traffic between the home location and the persons work destination. If there are any accidents reported between the home reference location and the destination work location, the Alexa will indicate to the user that extra time should be given to the drive, or an alternate route be used so they could arrive at work on time. In addition to potential accidents or road construction, reports could be given to the user pertaining to weather data, such as flooding, downed trees, or snow and ice conditions. The described invention teaches how to add additional sensor data to a digital assistant, such as but not limited to an Alexa type device, so that a user can be more accurately informed about ambient conditions, such as weather information including any possible wild fires that could impact a user's home, work, or drive to work. Alexa may only work when there is functioning Wi-Fi so that Alexa can communicate through the AVS (Alexa Voice Services). AVS is a cloud-based service that provides APIs to interface with the Alexa smart assistant. The AVS enables the Alexa unit to access cloud based Alexa capabilities. For example, when a user asks the question—"Alexa, what is the weather?" the question is sent via Wi-Fi from the Alexa unit to AVS. The Alexa unit itself has only minimal capabilities, and is generally not much more than a Wi-Fi microphone connected to AVS. It is the AVS that does the bulk of the work in recognizing what was said, and determining what to do with that information as well as actually performing tasks based on that information. After the AVS determines that weather information is wanted, the Alexa unit will report where the user's home location is and determine what climate reporting station is located in close proximity to that location. Without a viable Wi-Fi connection, the Alexa unit is nothing more than a glowing paperweight. One of the great ideas incorporated into the AVS is that Amazon, like other major companies, allowed skills to be incorporated into the unit. Amazon allows approved developers free access to AVS so that new Alexa skills can be created—thereby augmenting the Alexa unit. It is important to realize that although the Amazon Alexa is one embodiment, a person of ordinary skill in the art will recognize other home assistants such as, but not limited to, Amazon Dot, Google Home, and Apple HomePad are similarly functioning cloud based devices with their own versions of AVS.

It is understood that the voice activated digital assistants are capable of communicating their home location with cloud based servers. By having a physical, geographical location as a reference point, any remote sensors that can communicate with the appropriate cloud based communication protocol can transmit location aware information to voice activated digital assistants within a specified radius of the voice activated digital assistant. As an example, a remote sensor is located on a power line in Santa Clara, California, and a fire is detected. However, broadcasting a fire warning to every voice activated digital assistant would be a major annoyance to over ninety-nine percent of all voice activated digital assistants, and only of importance to those located within a short distance of the actual fire near Santa Clara, in this example. People living in Alaska or Hawaii will not be affected by a fire in Santa Clara, California, so a geographical region must be identified.

Since the voice activated digital assistants transmit location information to their cloud based servers, the servers can be configured to warn only the voice activated digital assistants located within a mile or less of the fire. This may be analogized to a reverse 911 system and alert those in immediate danger. Additionally, instead of an immediate warning alert, a watch alert can be sent to voice activated digital assistants that are further than a about mile away, but not more than about five miles away. Of course, other distances may be used. There could be a region of immediate danger, and a larger region of possible danger. With a watch alert, people at a greater distance have time to prepare for any possible evacuation if the wild fire gets larger.

FIG. 1 is a perspective view of a home assistant 10 and its power supply 20. In one embodiment, the home assistant may be an Amazon Alexa. The Amazon Alexa is one of several commercially available voice activated digital assistants designed to interact with people to help make basic tasks simpler and more convenient, such as the following:

Providing hands-free timers to help with cooking tasks.
Providing hands-free help with Fahrenheit to Celsius temperature conversion and conversion between metric to imperial units.
Providing hands-free creation of grocery, shopping, and To-Do lists.
Alerting the user to calendar events, and kid's school events and field trips.
Allowing hands-free audible weather alerts.
Allowing hands-free control of specially equipped ambient lighting.
Interactive hand-free audible games such as the popular television show Jeopardy as well as basic trivia games.
Providing hands-free audible flash news briefings and traffic alerts tailored to the users commute.

The home assistant 10, as well as the other commercially available voice activated digital assistants, provide a means for the user to interact with the outside world through cloud based, interactive services. By having the Amazon Alexa or other comparable audio digital assistants utilize cloud based real-time weather data, traffic data, and utility data, the user can be alerted to impending wildfires, floods, downed power lines, road closures caused by accidents or unusual weather phenomena, and other potential disrupting events. It should be obvious to those skilled in the art that although audio only devices are discussed, the disclosed invention also applies to visual as well as audio devices. Many large tech companies produce these devices, including, Amazon, and Google.

Figure 2:
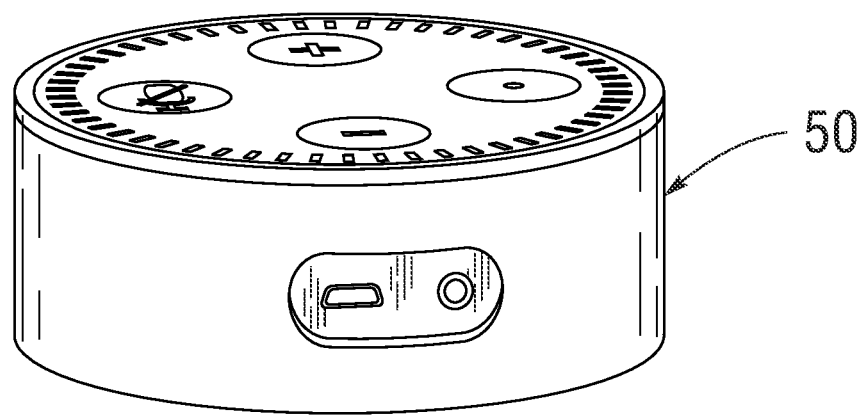
FIG. 2 is a perspective view another digital assistant.

FIG. 2 is a perspective view of another embodiment of a home assistant 50. In one embodiment, this home assistant 50 may be the Amazon Dot 10. The Amazon Dot—functionally similar to the Amazon Alexa, although in a smaller footprint—is one of several commercially available voice activated digital assistants designed to interact with people to help make basic tasks simpler and more convenient, such as the following:

Providing hands-free timers to help with cooking tasks.
Providing hands-free help with Fahrenheit to Celsius temperature conversion and conversion between metric to imperial units.
Providing hands-free creation of grocery, shopping, and To-Do lists.
Alerting the user to calendar events, and kid's school events and field trips.
Allowing hands-free audible weather alerts.
Allowing hands-free control of specially equipped ambient lighting.
Interactive hand-free audible games such as the popular television show Jeopardy as well as basic trivia games.
Providing hands-free audible flash news briefings and traffic alerts tailored to the users commute.

The Amazon Dot, as well as the other commercially available voice activated digital assistants; provide a means for the user to interact with the outside world through cloud based, interactive services. By having the Amazon Dot or other comparable audio digital assistants utilize cloud based real-time weather data, traffic data, and utility data, the user can be alerted to impending wildfires, floods, downed power lines, road closures caused by accidents or unusual weather phenomena, and other potential disrupting events. It should be obvious to those skilled in the art that although audio only devices are discussed, the disclosed invention also applies to visual as well as audio devices. Many large tech companies produce these devices, including, Amazon, and Google.

Figure 3:
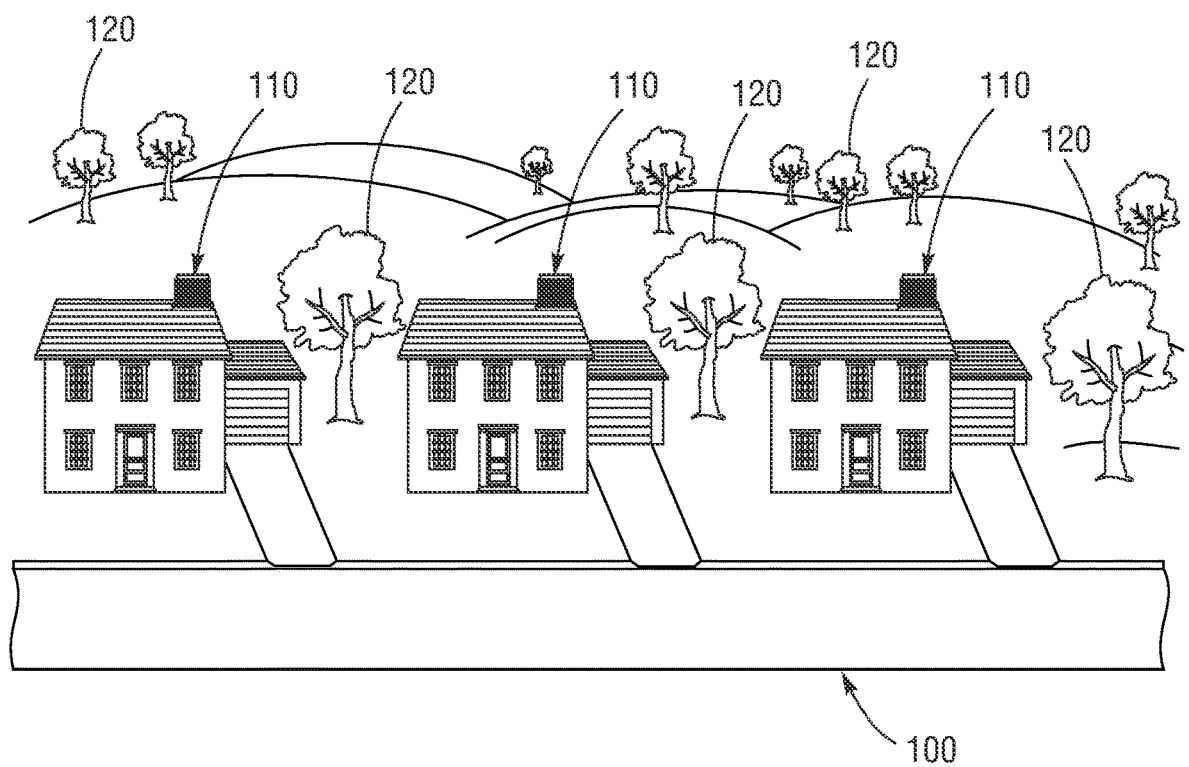
FIG. 3 shows a residential housing development.

FIG. 3 is a schematic drawing of a typical residential housing development, detailing three houses 110 that have driveways and garages. The homes are connected along a common main road 100, and the houses have trees 120 arranged throughout the yards. It is important to note that the homes are all equipped with some type of audio digital assistant such as, but not limited to Amazon Alexa, Amazon Dot, or Google Home.

Figure 4:
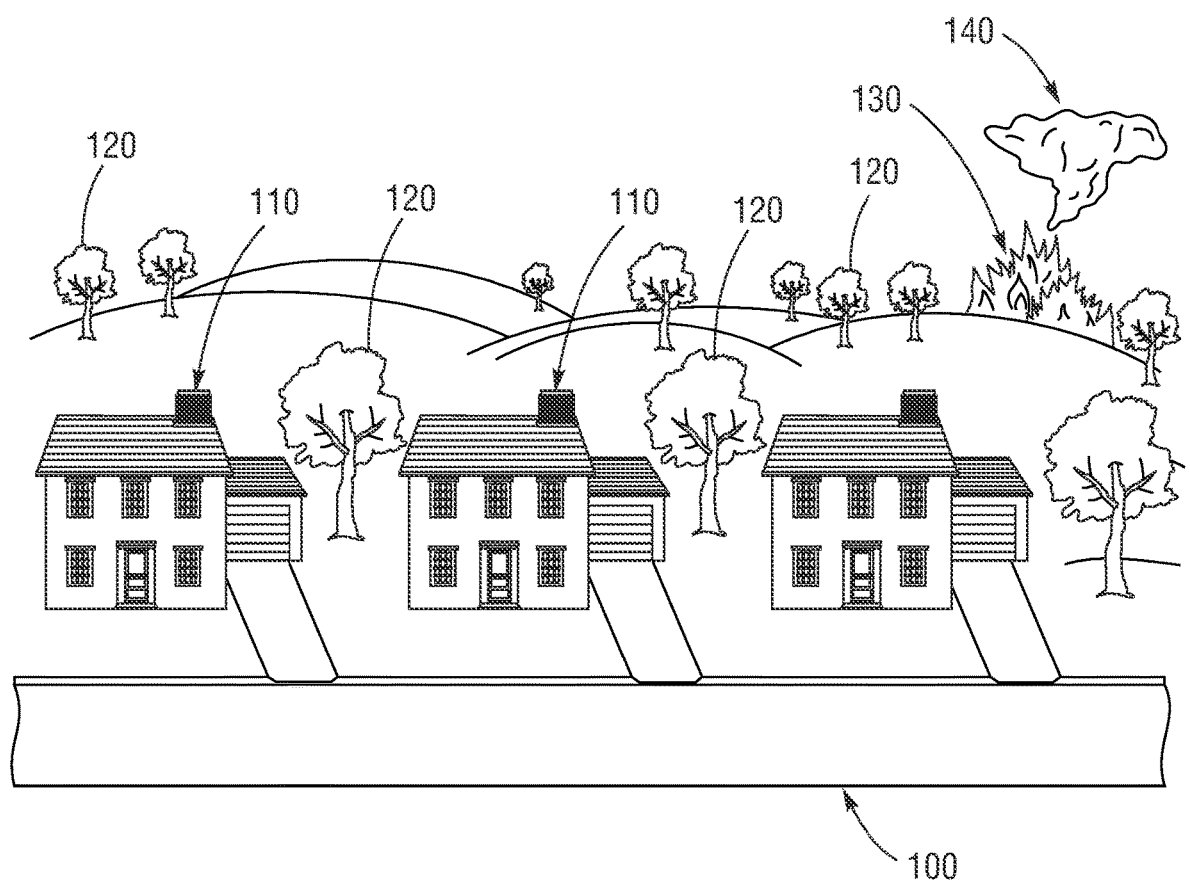
FIG. 4 shows a residential housing development and a wildfire.

FIG. 4 is a schematic drawing similar to FIG. 3, however in this figure, there is a wildfire 130 that is producing large amounts of smoke 140 that may or may not have been noticed by the three homes shown in the figure. With external sensors making real-time ambient measurements, the smoke would be detected, as well as the infrared signature of the fire and an alert would be sent to the commercially available voice activated digital assistants 10, 50.

Figure 5:
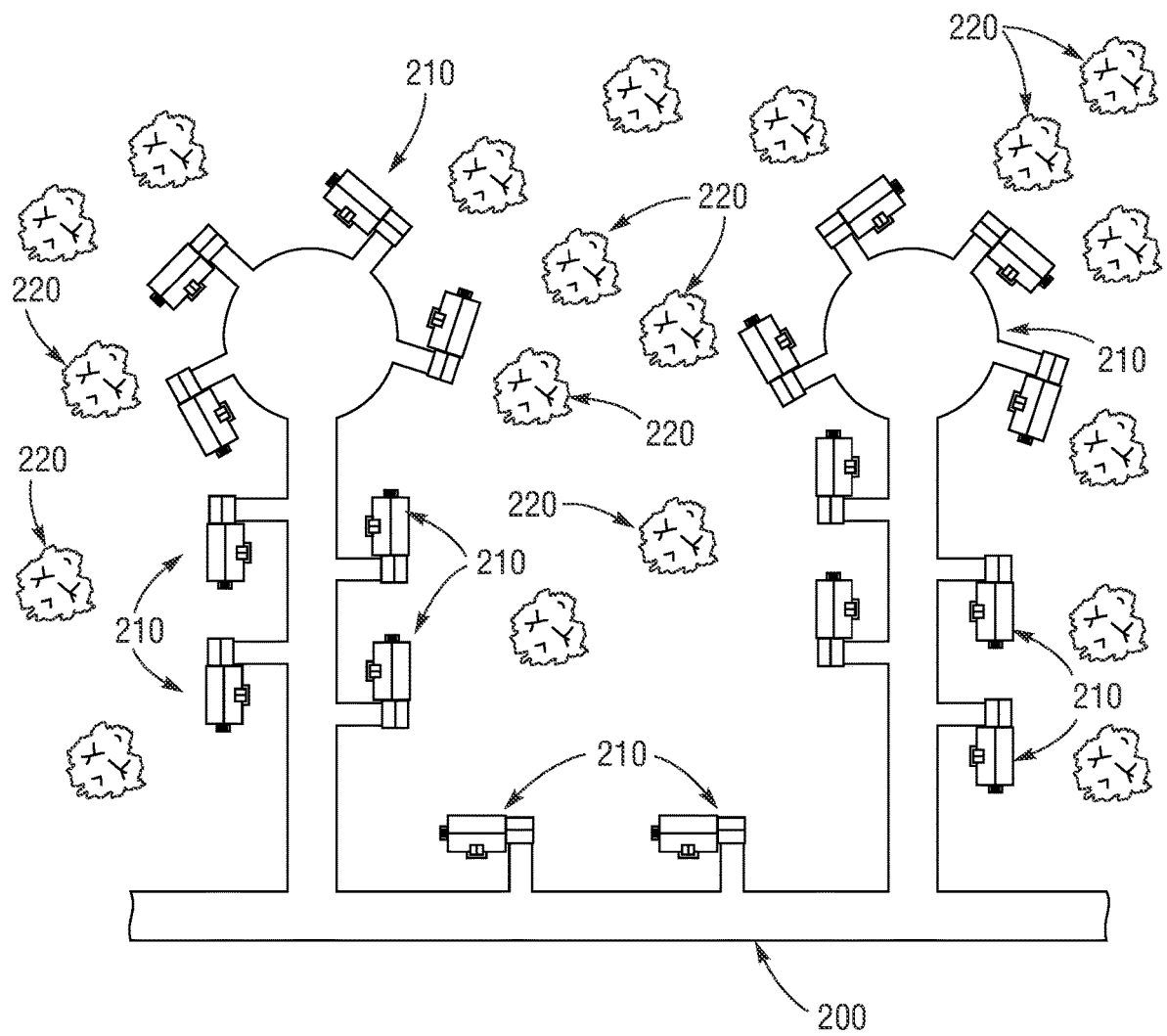
FIG. 5 is a schematic aerial representation of a residential housing development.

FIG. 5 is a schematic aerial view of a typical residential neighborhood, detailing a plurality of houses 210 that have driveways and garages. The houses 210 are located along a common main road 200, and the houses have trees 220 arranged throughout the yards. It is important to note that the homes are all equipped with some type of audio digital assistant such as an Amazon Alexa, Amazon Dot, or Google Home.

Figure 6:
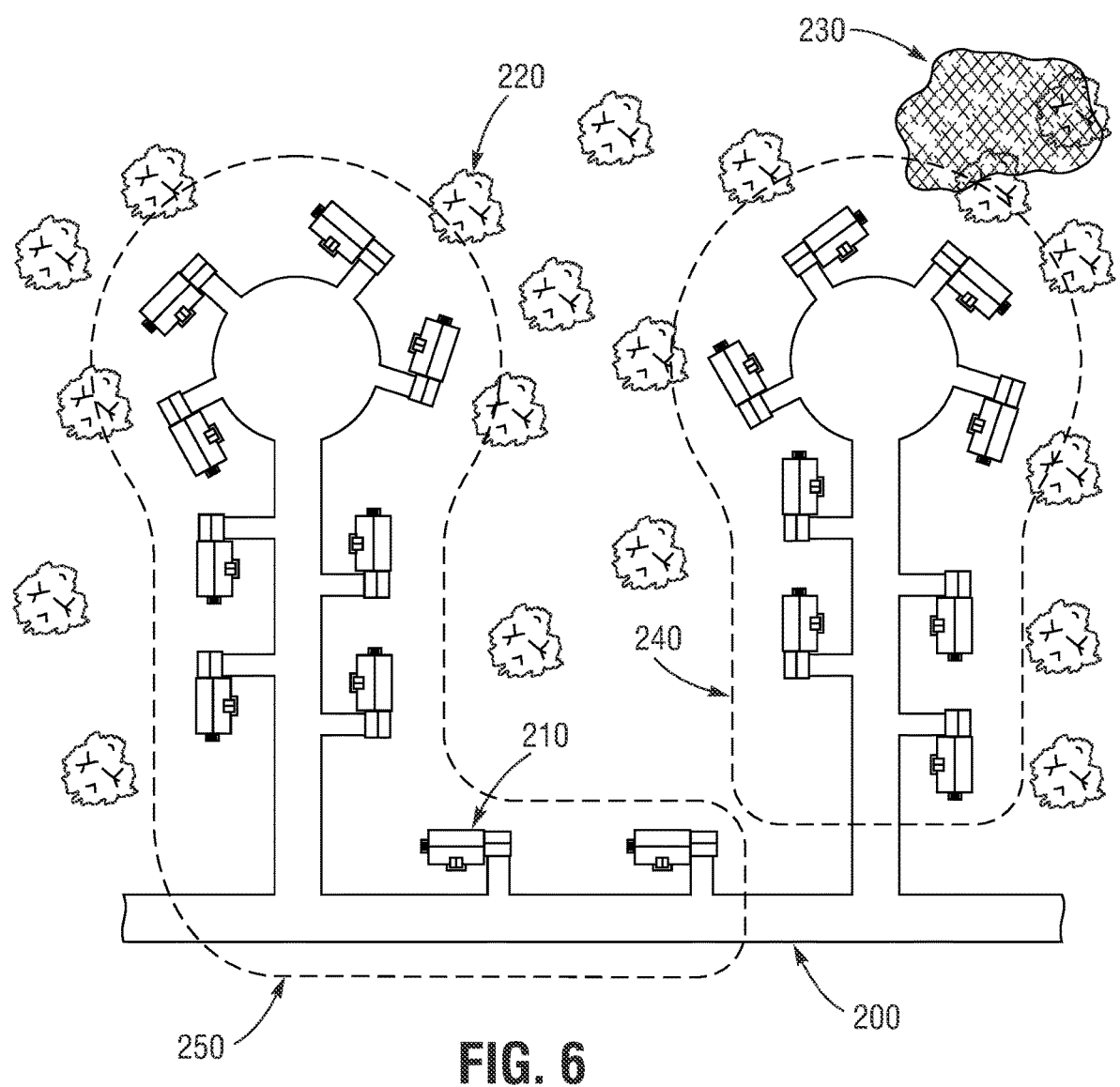
FIG. 6 is a schematic aerial representation of a residential housing development and a wildfire.

FIG. 6 is the schematic aerial view of the neighborhood from FIG. 5. However in this figure, there is a wildfire 230 that may or may not have been noticed by the homes shown in the figure. With external sensors making real-time ambient measurements, the smoke would be detected, as well as the infrared signature of the fire and an alert would be sent to the commercially available voice activated digital assistants. Since the GPS (Global Positioning System) locations of the homes are known to the audio digital assistants, and the real-time sensors monitoring ambient conditions have a known GPS location, an evacuation warning can be sent to the homes that are closest in proximity to the wildfire. The dashed line 240 surrounding the homes on the right are in imminent danger from the close proximity to the wildfire, while a dashed line 250 surrounds the homes on the left are in less danger because they are further from the wildfire.

Figure 7:
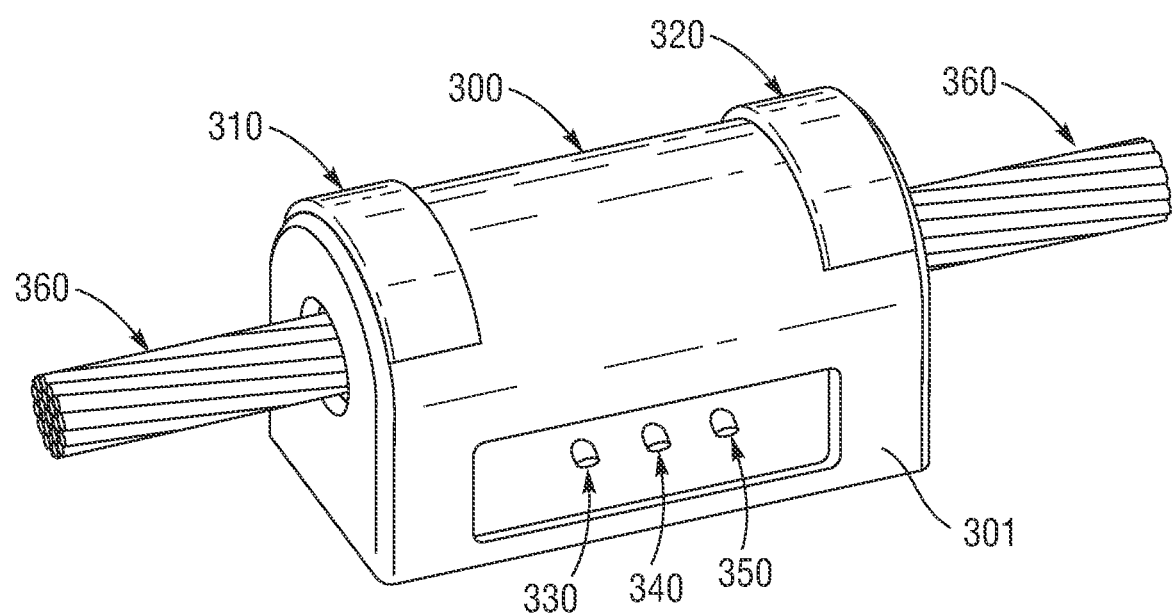
FIG. 7 shows a perspective view of a power transmission line monitor attached to a power transmission line.

FIG. 7 shows a perspective view of a power transmission line monitor 301. The power transmission line monitor 301 comprises a clamshell housing 300 that encircles a power transmission line 360. The clamshell housing 300 may be held closed with retaining strips 310 and 320. The power transmission line monitor 301 may comprise visual status LED lamps 330, 340, 350 located on the outside face of the clamshell housing 300. The LED lamps may be different colors, and in one embodiment may be a green lamp 330, yellow lamp 340, and red lamp 350. Although wavelengths in the visual spectrum are specified, one or more of the LED lamps may be chosen so that their operating wavelength is outside of the normal visual spectrum. The important thing to understand is that the optical receiver may utilize a matching wavelength and/or be configured to detect the optical wavelength outside of the normal visual spectrum.

Figure 8:
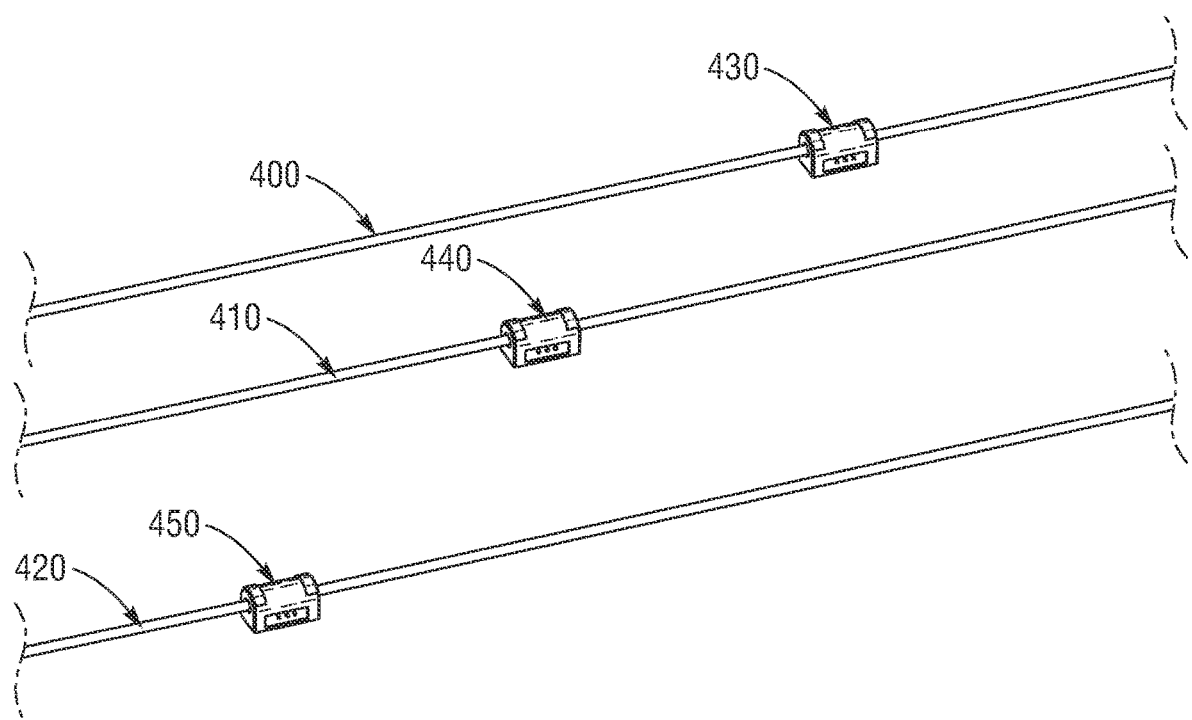
FIG. 8 shows a perspective view of three parallel power transmission line monitors.

FIG. 8 is a perspective view of three parallel power line monitors 430, 440, and 450, each being equipped with ambient real-time sensors. Three phase power transmission lines are represented by 400, 410, and 420 respectively.

Figure 9:
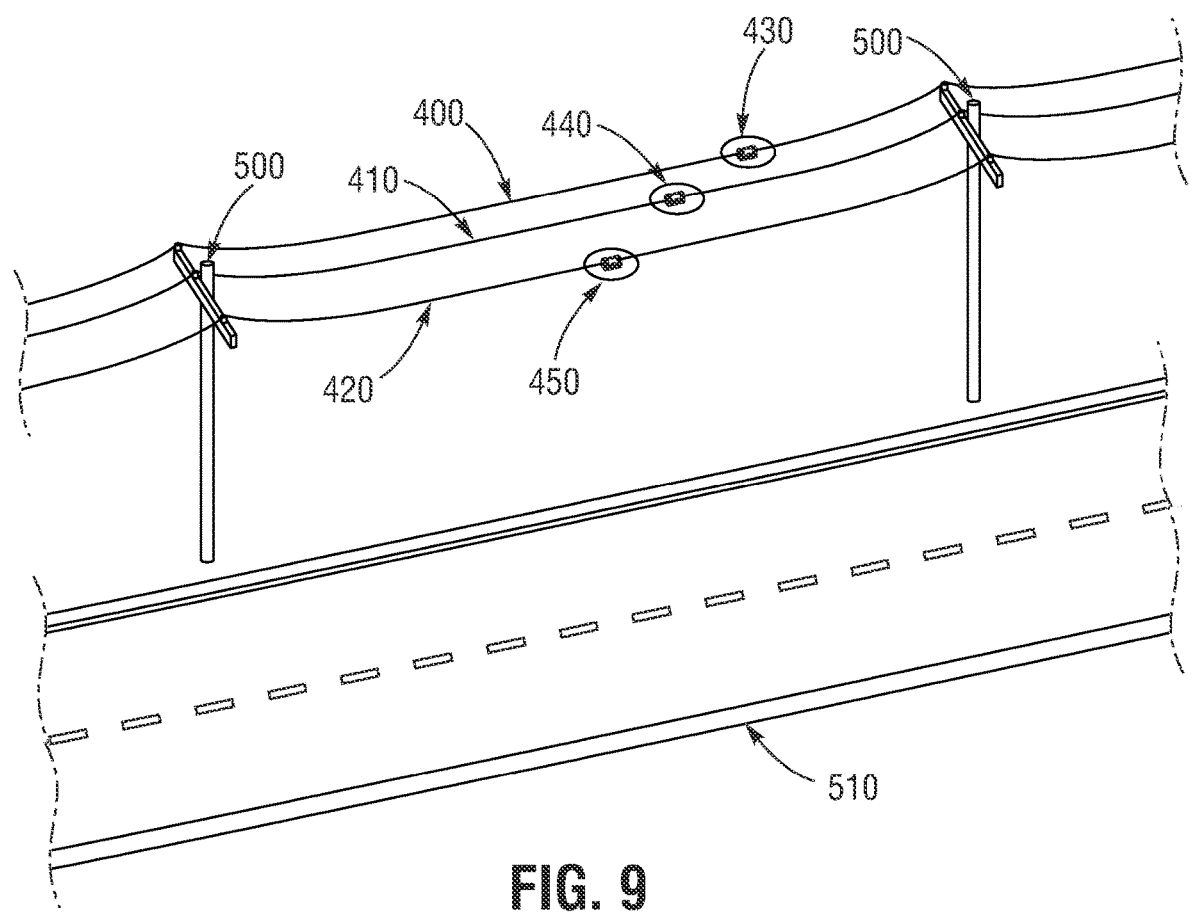
FIG. 9 shows a perspective view of a power transmission line monitors located next to a roadway.

FIG. 9 shows the power line monitors located next to a roadway 510, a typical location for power transmission lines 400, 410, and 420. The transmission lines are supported by poles 500. Power line monitors 430, 440, and 450 are preferably staggered with respect to one another along the transmission line.

Figure 10:
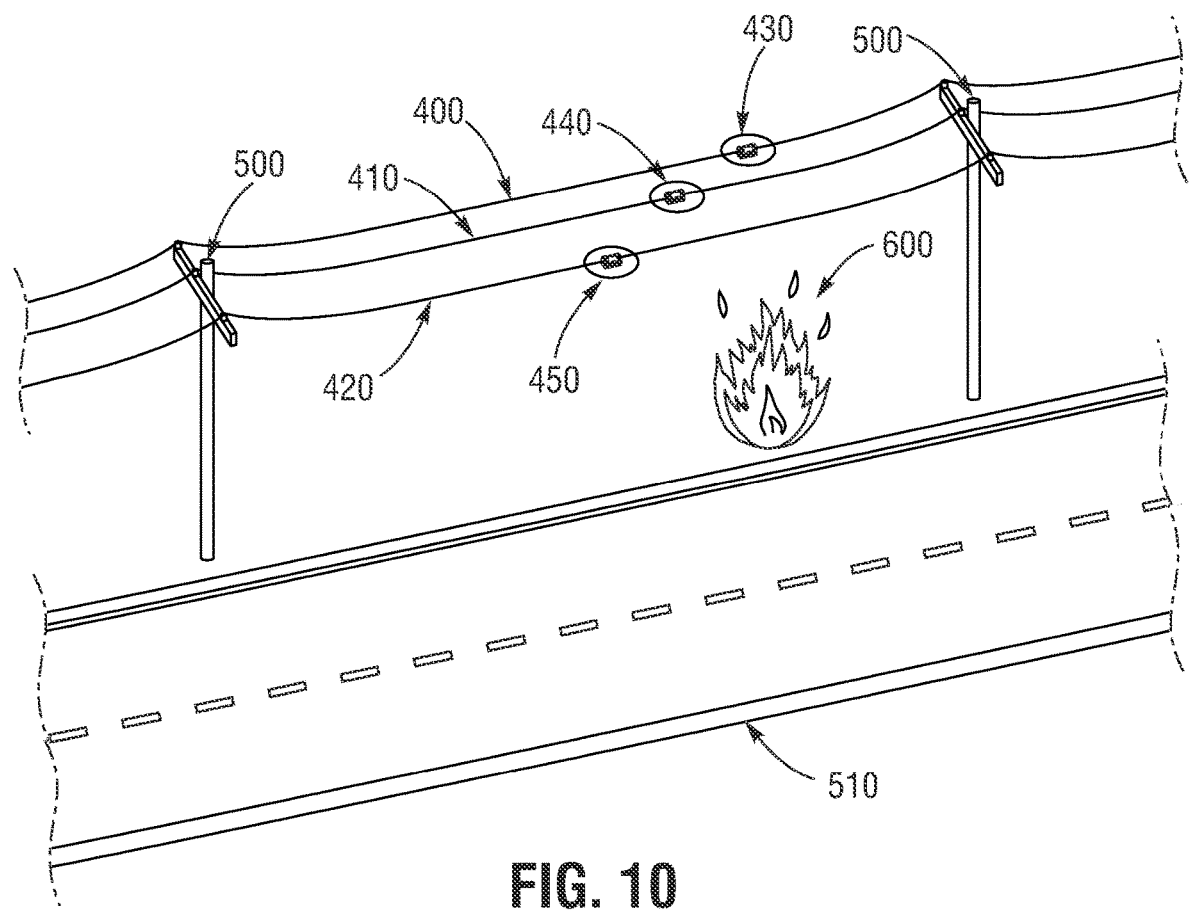
FIG. 10 shows a perspective view of power transmission line monitors located next to a roadway and a fire.

FIG. 10 shows several power line monitors 430, 440 and 450 attached to power transmission lines 400, 410 and 420, the lines located next to a roadway 510. The transmission lines are supported by poles 500. Transmission line monitors 430, 440, and 450 are preferably staggered with respect to one another along the transmission lines 400, 410, 420. In a situation in which there is a brush or ground fire 600 within close proximity to the transmission line monitors 430, 440, and 450, one or more of the transmission line monitors 430, 440, 450 will measure a sudden increase in ambient temperature. This sudden increase will be indicative of a brush or ground fire and the microcontroller, which is part of the an ambient sensor package that is part of the power transmission line monitor, will indicate an alarm condition through use of the communication module which includes multicolored LED visual indicators, an acoustic alarm, such as a piezo buzzer to warn pedestrians of a power line hazard, and is configured to provide RF communication with a network, the power utility, cellular devices such as a smart phone, and simplex or duplex communication with other power line monitors. Due to the unique nature of LED's to switch on and off rapidly, a coded optical message could be sent to a capable optical receiver located within a short distance from the power transmission line monitor. The LED can rapidly flash a specific pattern of pulses that can be read with an appropriate optical receiver that would be able to read the status of the transmission line monitor. The status information could be a repeated series of status codes indicating the conditions that were monitored, such as temperature, electric current, any excessive three-axis shock, and the time and date of the occurrence. Because the LED's can be switched on and off so rapidly, it would be impossible for the human to interpret this information. Forrest M. Mims III has long pioneered the "dual use" of LED's as not only sources of illumination, but also as narrow band light sensors. Mims wrote a paper for Applied Optics magazine in 1992, entitled "Sun Photometer with Light-Emitting Diodes as Spectrally Selective Detectors", and the Mims paper is fully incorporated by reference herein. In this paper, Mims describes how to use LED's in a reciprocal role as a narrow band light sensor. The dual use (light transmission and light reception) is referred to as the "Mims effect". Since the LED cannot do both things at the exact same time, the microcontroller, that is part of the power transmission line monitor, may periodically place the indicating LED in a reversed bias condition. In this way, the individual LED's can serve as a duplex method of serial communication. Each individual transmission line monitor can be interrogated by a remote optical transceiver that can be either a truck mounted unit, a portable, hand held unit, or a small, lightweight unit capable of being carried by a small autonomous drone to provide long range monitoring of the transmission lines. In addition to measuring an ambient temperature increase near the transmission lines due to a fire, there may also exist a situation where the fire is locally heating a transmission line some distance away from the transmission line sensor where the ambient temperature has not changed much, but the transmission line itself may be heating up due to exposure to a fire or heat source. In this case, by transmitting this data to the relevant individuals in charge of transmission line safety, lineman could be sent to investigate the situation before the transmission line has a catastrophic failure. Any transmission line failure can cost thousands, if not hundreds of thousands of dollars in damage to infrastructure. In extreme situations, in which a transmission line failure causes a large wild fire, as has happened in the state of California over recent years, the damage could result in the loss of infrastructure, livestock, homes, and lives, and could potentially run into billions of dollars! By carefully and closely monitoring ambient conditions around transmission lines as well as the conditions of the transmission line itself, diagnostic information can be produced that will allow the relevant individuals in charge of transmission line safety to investigate a potential hazardous situation before the transmission line has a catastrophic failure.

Real-time sensor data sent from the power transmission line monitors would be transmitted from the power line modules communication module to a remote server—owned and operated by the manufacturer or owner of the smart assistant, such as Amazon, Microsoft, or Google, or another suitable entity, so that this information can be relayed based upon GPS location to the affected houses containing home audio/visual digital assistants.

Figure 11:
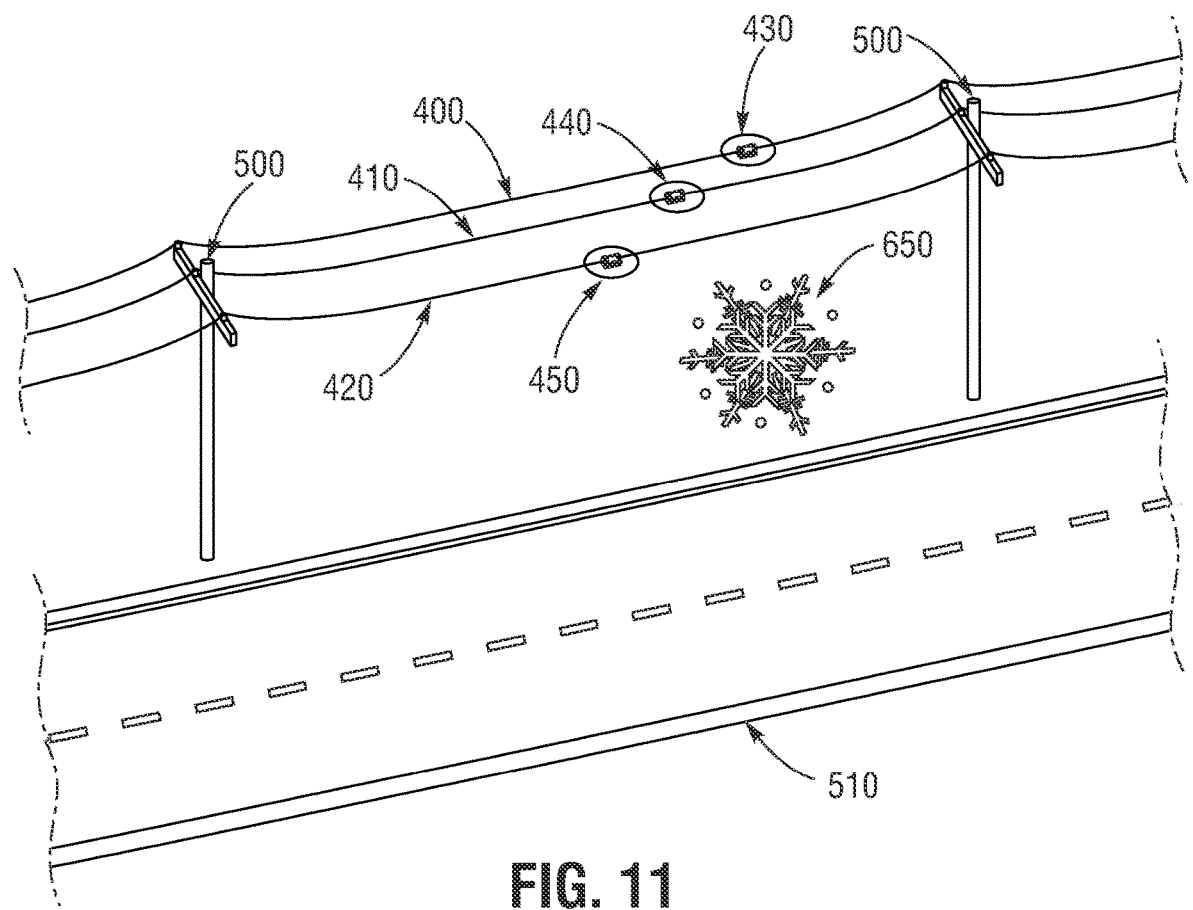
FIG. 11 shows a perspective view of power transmission line monitors located next to a roadway and freezing line conditions.

FIG. 11 shows several power line monitors 430, 440 and 450 attached to power transmission lines 400, 410 and 420, the lines located next to a roadway 510. The transmission lines are supported by poles 500. Transmission line monitors 430, 440, and 450 are preferably staggered with respect to one another along the transmission lines 400, 410, 420. There is a camera affixed to the line monitor that is capable of transmitting line image information back to a monitoring location. In a situation in which there is an icing condition 650 within close proximity to the transmission line monitors 430, 440, and 450, one or more of the transmission line monitors 430, 440, 450 will measure a decrease in ambient temperature, preferably below 0 degrees Celsius. This decrease, preferably in addition to a visual indication, will be indicative of a brush or ground fire and the microcontroller, which is part of the an ambient sensor package that is part of the power transmission line monitor, will indicate an alarm condition through use of the communication module which includes multicolored LED visual indicators, an acoustic alarm, such as a piezo buzzer to warn pedestrians of a power line hazard, and is configured to provide RF communication with a network, the power utility, cellular devices such as a smart phone, and simplex or duplex communication with other power line monitors. Due to the unique nature of LED's to switch on and off rapidly, a coded optical message could be sent to a capable optical receiver located within a short distance from the power transmission line monitor. The LED can rapidly flash a specific pattern of pulses that can be read with an appropriate optical receiver that would be able to read the status of the transmission line monitor. The status information could be a repeated series of status codes indicating the conditions that were monitored, such as temperature, electric current, any excessive three-axis shock, and the time and date of the occurrence. Because the LED's can be switched on and off so rapidly, it would be impossible for the human to interpret this information. A microcontroller that is part of the power transmission line monitor, may periodically place the indicating LED in a reversed bias condition. In this way, the individual LED's can serve as a duplex method of serial communication. Each individual transmission line monitor can be interrogated by a remote optical transceiver that can be either a truck mounted unit, a portable, hand held unit, or a small, lightweight unit capable of being carried by a small autonomous drone to provide long range monitoring of the transmission lines. In addition to measuring an ambient temperature increase near the transmission lines due to a fire, there may also exist a situation where the fire is locally heating a transmission line some distance away from the transmission line sensor where the ambient temperature has not changed much, but the transmission line itself may be heating up due to exposure to a fire or heat source. In this case, by transmitting this data to the relevant individuals in charge of transmission line safety, lineman could be sent to investigate the situation before the transmission line has a catastrophic failure. By carefully and closely monitoring ambient conditions around transmission lines as well as the conditions of the transmission line itself, diagnostic information can be produced that will allow the relevant individuals in charge of transmission line safety to investigate a potential hazardous situation before the transmission line has a catastrophic failure.

Figure 12:
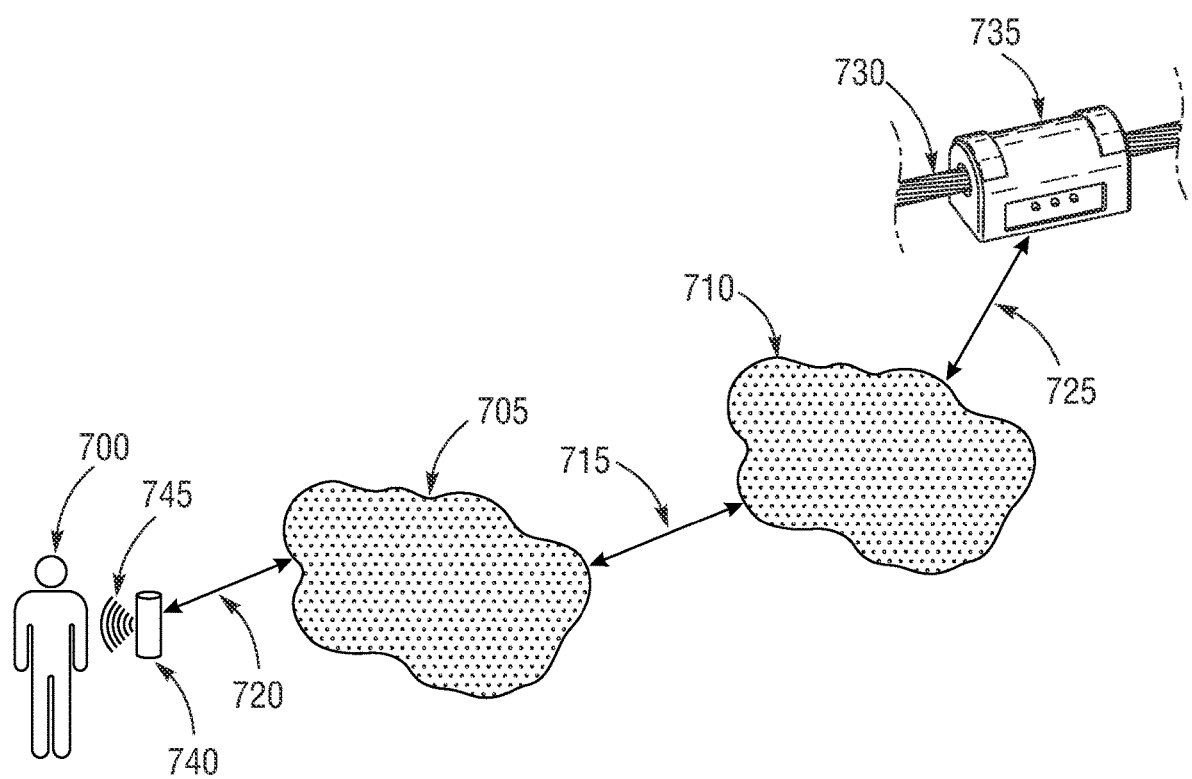
FIG. 12 shows a perspective view of power transmission line monitors detecting ice on the powerline, preferably using via a camera.

FIG. 12 shows a user 700 that are within close proximity of a voice activated digital assistant 740. The user 700 is listening to the audio 745 generated by the voice activated digital assistant 740. There is an active Wi-Fi link 720 between the voice activated digital assistant 740 and a cloud computing service 705, such as but not limited to AVS. Without the active Wi-Fi link 720, the voice activated digital assistant 740 may not respond to any user generated commands or query's. An internet based link 715 exists between the cloud computing service 705 and a cloud computing service for the power line monitor 710. The power line cloud computing service 710 may process geographic location data that will indicate where on Earth the specific location of each power line monitor is. The power line monitor 735 is attached to a power line 730 and will monitor a series of power line conditions, including power line vibration, power line g-shock, power line voltage, ambient temperature, and power line temperature, to name a few. For more detailed description of what is monitored, see U.S. Pat. No. 9,970, 975. Power line status information may be transmitted from the power line monitor 735 to the power line cloud computing service 710 through a communication link 725.

When a group of homes are located within close proximity to an abnormal situation such as a wild fire located in close proximity to a power line monitor, the geographic location of the power line monitors that are recorded in the power line cloud services 710 will be in continual communication with any voice activated digital assistants in a danger zone. When the geographical location of any voice activated digital assistants are determined to be within close proximity (for example, within one mile) of the geographical location of the power line sensor reporting the wild fire or icing condition or potential icing condition, an immediate warning alert would be sent to those voice activated digital assistants to let the occupants know that they are in potential or immediate danger, icing being potential danger while a fire being an immediate danger. Any voice activated digital assistants that are located at a further distance than one mile, but not more than three miles for example, would be issued a watch alert—indicating that they might be in danger if a wild fire were to spread. This would give people that are further away a "heads up" notice so they can prepare for any possible evacuation. If people were warned about a fire that live a much greater distance away, for example ten miles, then an unnecessarily high volume of traffic could be created when they are not in any immediate danger. This high volume of traffic could impede first responders that are dispatched to combat the wild fire. Since the voice activated digital assistant does not have the computational ability to make the decision about who is in immediate danger and who is not, the AVS cloud computing service has the necessary computational ability to make accurate decisions. In a potential powerline icing condition, users would be able to prepare for potential power loss and the possibility that utility rates may suddenly increase, and take appropriate steps.

It is important to note that although the Amazon AVS cloud computing services that are used in conjunction with Amazons Alexa and Dot voice activated digital assistants, the invention may work with any other digital assistant, such as those digital assistants sold by Google, Apple, and Microsoft or other manufacturers or entities. Further, smart devices, such as tablet, cell phones, etc., may become digital assistants in the future simply by downloading an app, or changing the settings on the smart device. Many organizations have their own cloud based computing service that communicates with their (or other) voice activated digital assistants. Amazon's protocol was shown as an example, but it could just have easily been Google, Apple, or Microsoft, or any other entity to sells digital assistants or makes apps that can turn a smart device into a digital assistant, or entities that sell smart devices that have the option to become digital assistants.

Figure 13:
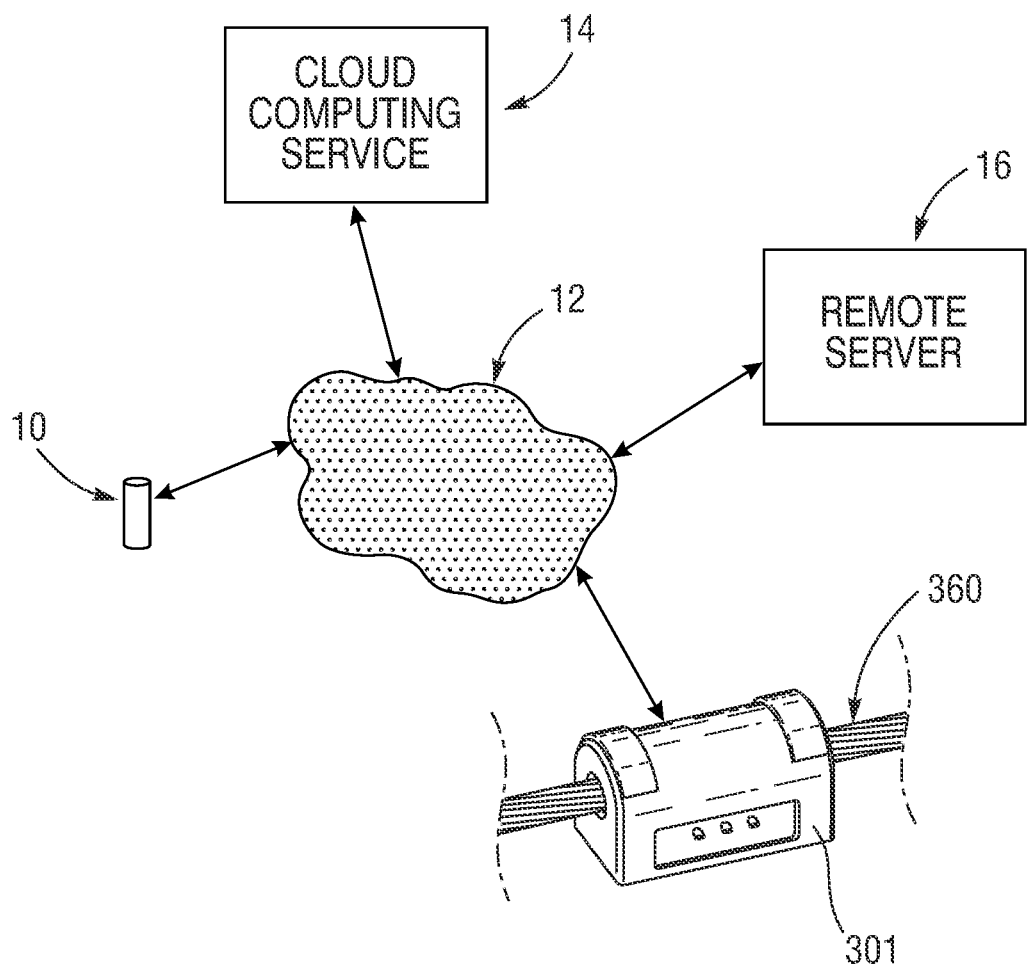
FIG. 13 is a schematic drawing depicting communication between cloud services and a power transmission line monitor and a user.

FIG. 13 is a schematic of another embodiment of the system. A digital assistant 10 is in communication with a network 12. The network 12 may be the internet, or an intranet, or any other suitable network. The digital assistant 10 is in communication with a cloud computing service 14 via the network 12. The cloud computing service 14 may be a service like the Alexa Voice Services, or any other suitable service. A power transmission line monitor 301 is attached to a power transmission line 360. The power transmission line monitor 301 is in communication with the network 12. The power transmission line monitor 301 is in communication with a remote server 16. The remote server may be in communication with the cloud computing service 14 via the network 12.

Figure 14:
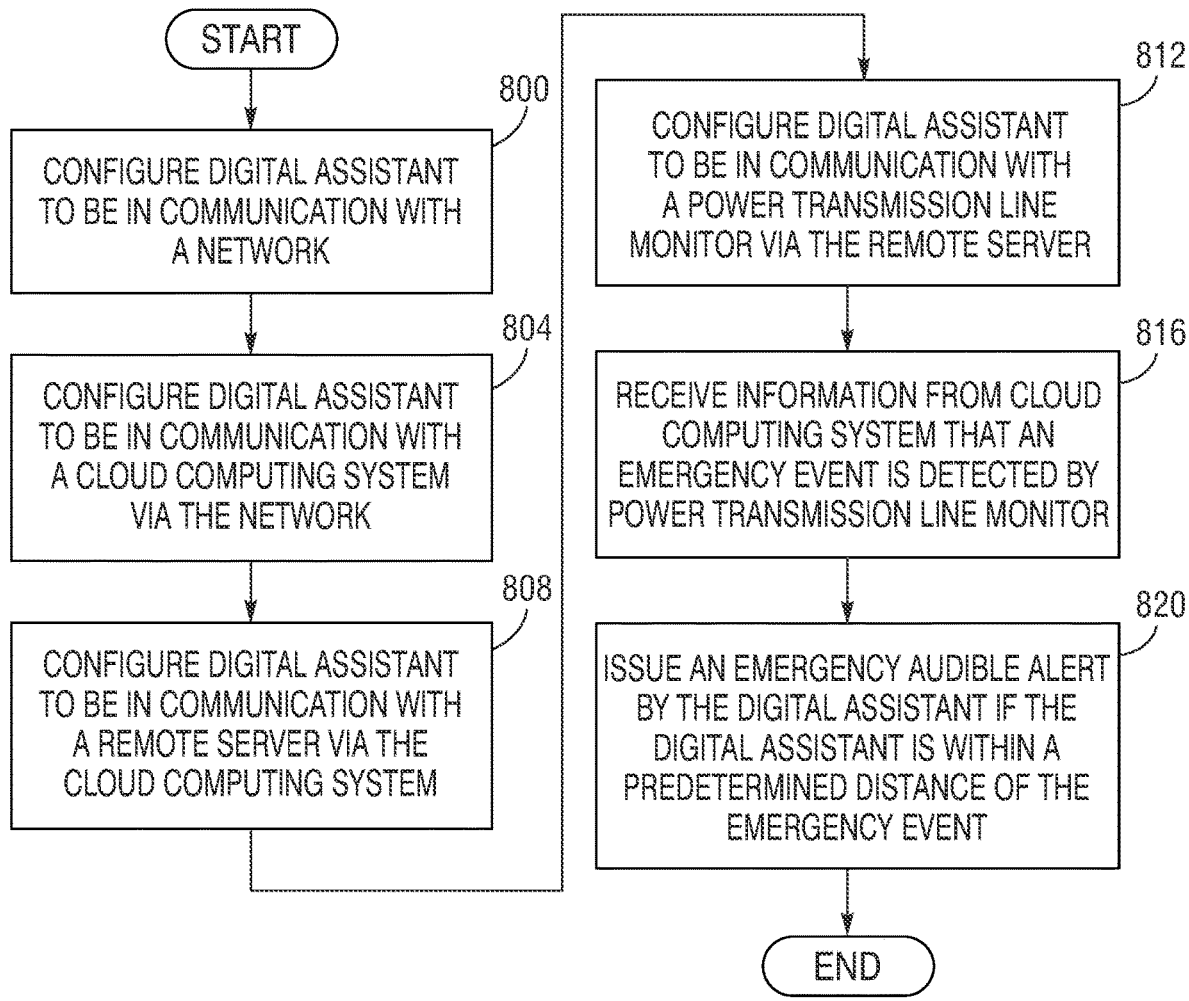
FIG. 14 is a flowchart showing an embodiment of the invention.

FIG. 14 is a flowchart illustrating a method that may be performed by the digital assistant. At act 800, the digital assistant is configured to be in communication with a network. At act 804, the digital assistant is configured to be in communication with a cloud computing system via the network. At act 808, the digital assistant is configured to be in communication with a remote server via the cloud computing system. At act 812, the digital assistant is configured to be in communication with a power transmission line monitor via the server. At act 816, the digital assistant receives information from the cloud computing system that an emergency event is detected by the power transmission line monitor. At act 820, the digital assistant issues an emergency audible alert if the digital assistant is within a predetermined distance of the emergency event.

Figure 15:
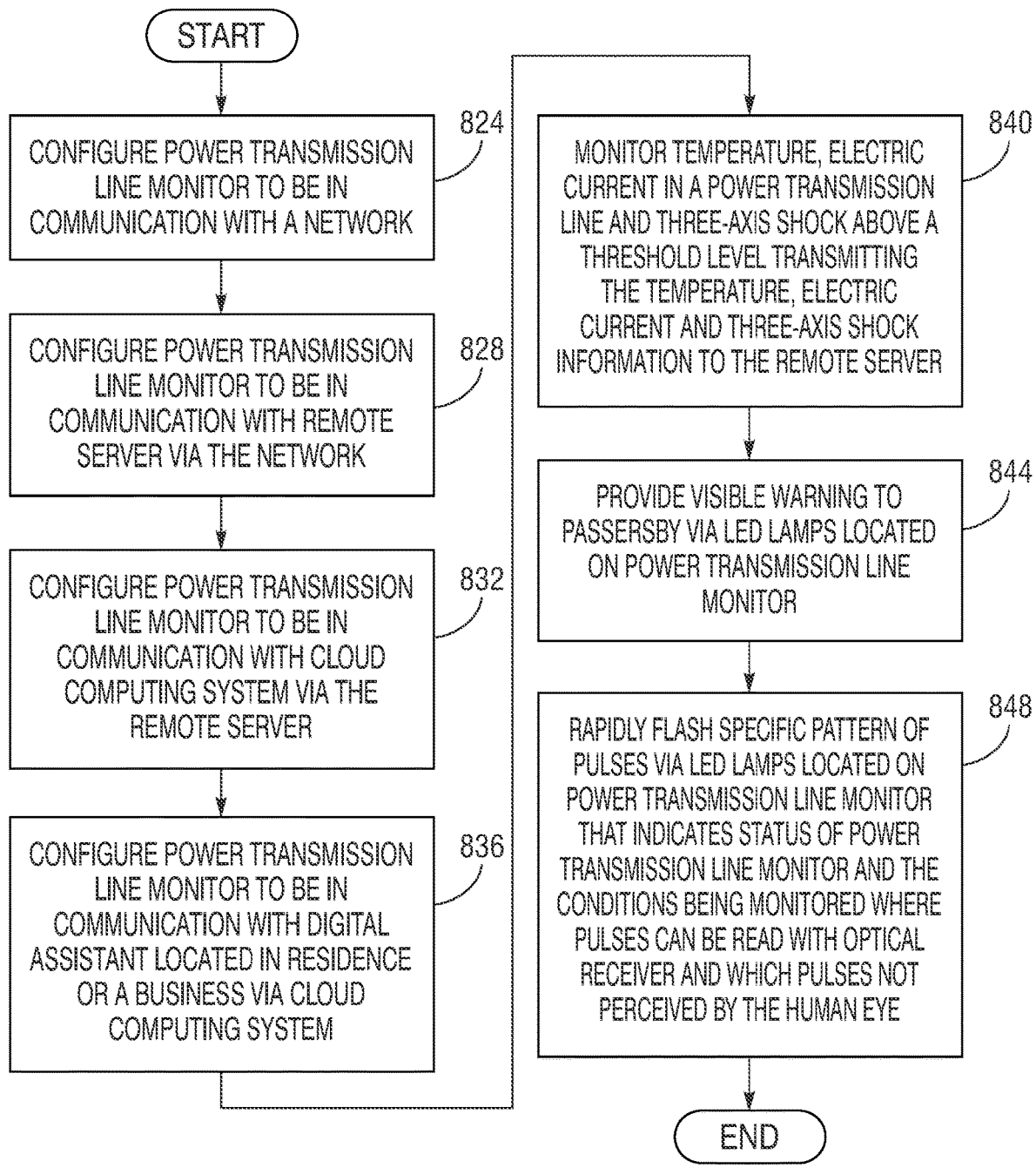
FIG. 15 is a flowchart showing one embodiment of a method performed by the digital assistant.

FIG. 15 is a flowchart illustrating a method that may be performed by the power transmission line monitor. At act 824, the power transmission line monitor is configured to be in communication with a network. At act 828, the power transmission line monitor is configured to be in communication with a remote server via the network. At act 832, the power transmission line monitor is configured to be in communication with a cloud computing system via the remote server. At act 836, the power transmission line monitor is configured to be in communication with a digital assistant located in a residence or a business via the cloud computing system. At act 840, the power transmission line monitor monitors temperature, electric current in a power transmission line, and three-axis shock above a threshold level, and transmits the temperature, electric current, and three-axis shock information to the remote server. At act 844, the power transmission line monitor provides a visible warning to passersby via led lamps located on the power transmission line monitor. At act 848, the power transmission line monitor rapidly flashes a specific pattern of pulses via led lamps, located on the power transmission line monitor, that indicates the status of the power transmission line monitor and the conditions being monitored, wherein the pulses can be read with an optical receiver and which individual pulses cannot be perceived by the human eye. The flashing of the lamps in an embodiment, a code such that a smart phone or other smart device, using decoding software, can report powerline icing conditions that may result in line failure and therefore, power distribution loss.

Figure 16:
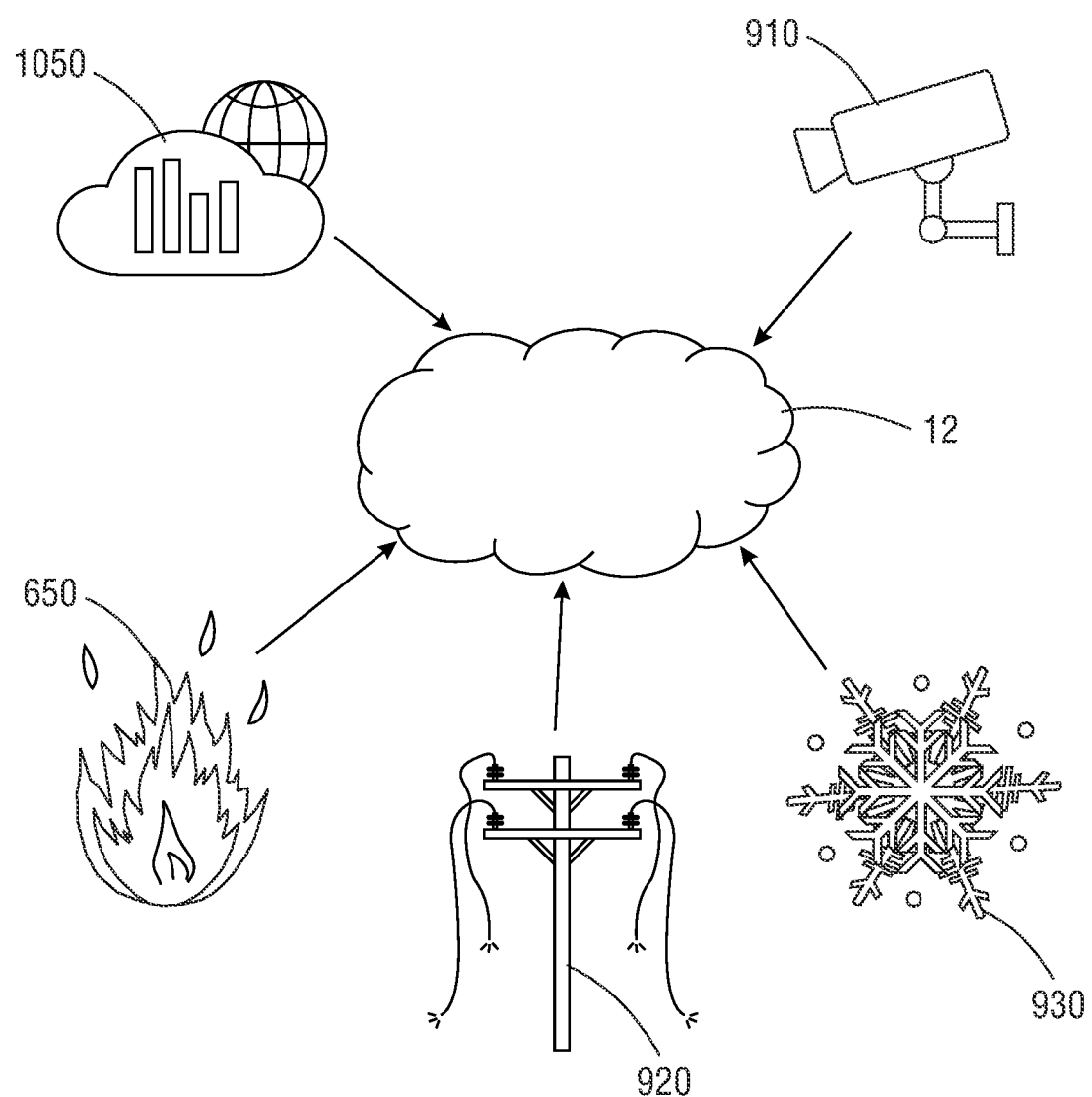
FIG. 16 is a an embodiment of the relationship of data inputs to the powerline monitoring system.

FIG. 16 is schematic drawing showing an overview of the preferred data inputs for the disclosed invention powerline monitoring system. The present cost for the electrical power rate, in kWh-hr, is shown in item 1050. This rate may be obtained from the local or state government utility oversight commission or via market prices provided over the internet 12. Visual indication of powerline damage or impending damage is uploaded to the cloud 12, as is fire detection 650, freezing conditions on the powerline 930, or physically downed powerlines 920.

Figure 17:
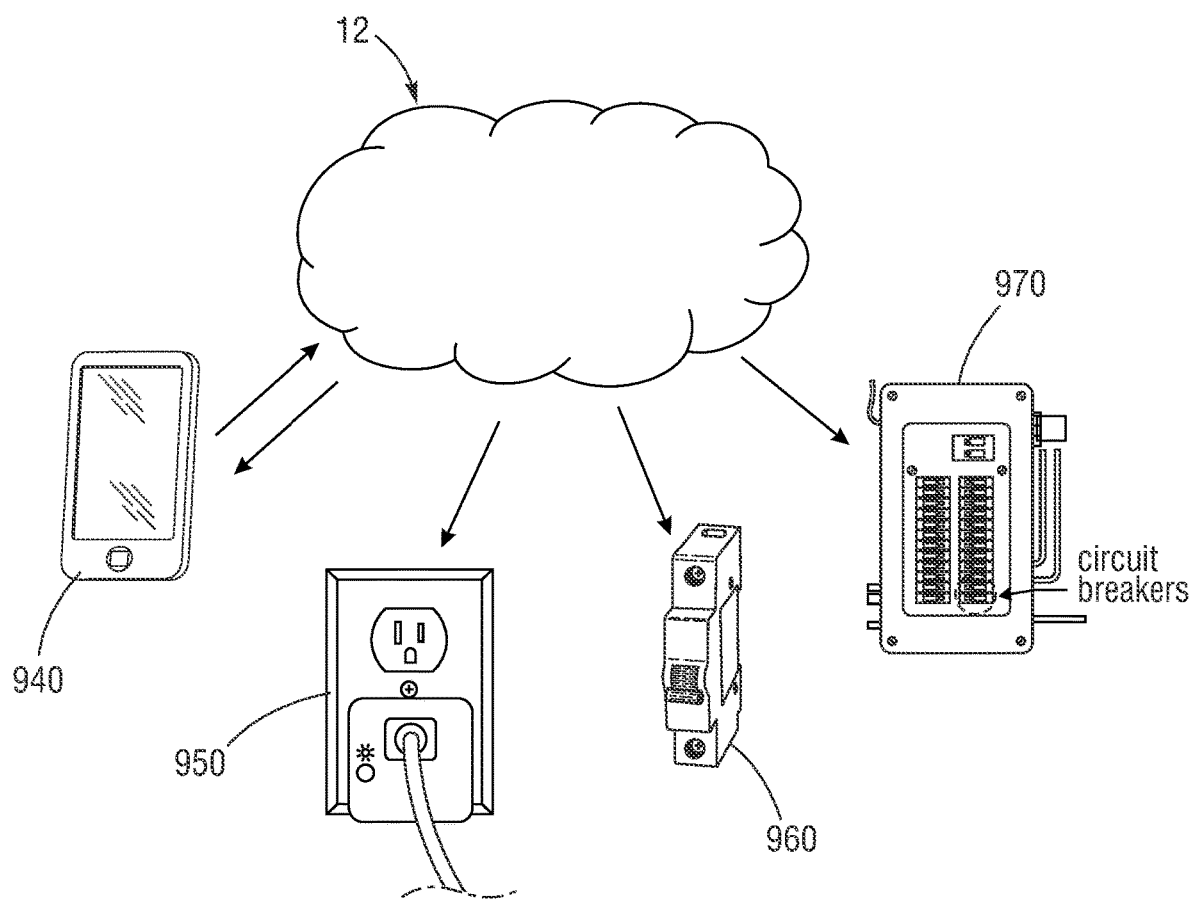
FIG. 17 is a schematic drawing showing user-subscriber home control elements to the powerline monitoring system.

FIG. 17 is a schematic drawing showing an embodiment of devices in communication with each other in the user-consumers home. These include a computing or smart device 940, a smart electrical outlet 950 that can be connected or disconnected to the home or business powerline distribution system, a smart circuit breaker 960 that disconnects or "trips" when the local power utility rates exceed a predefined threshold or any other condition defined by the user-subscriber, and a smart electrical utility box that is in communication with the internet or intranet 12.

Figure 18:
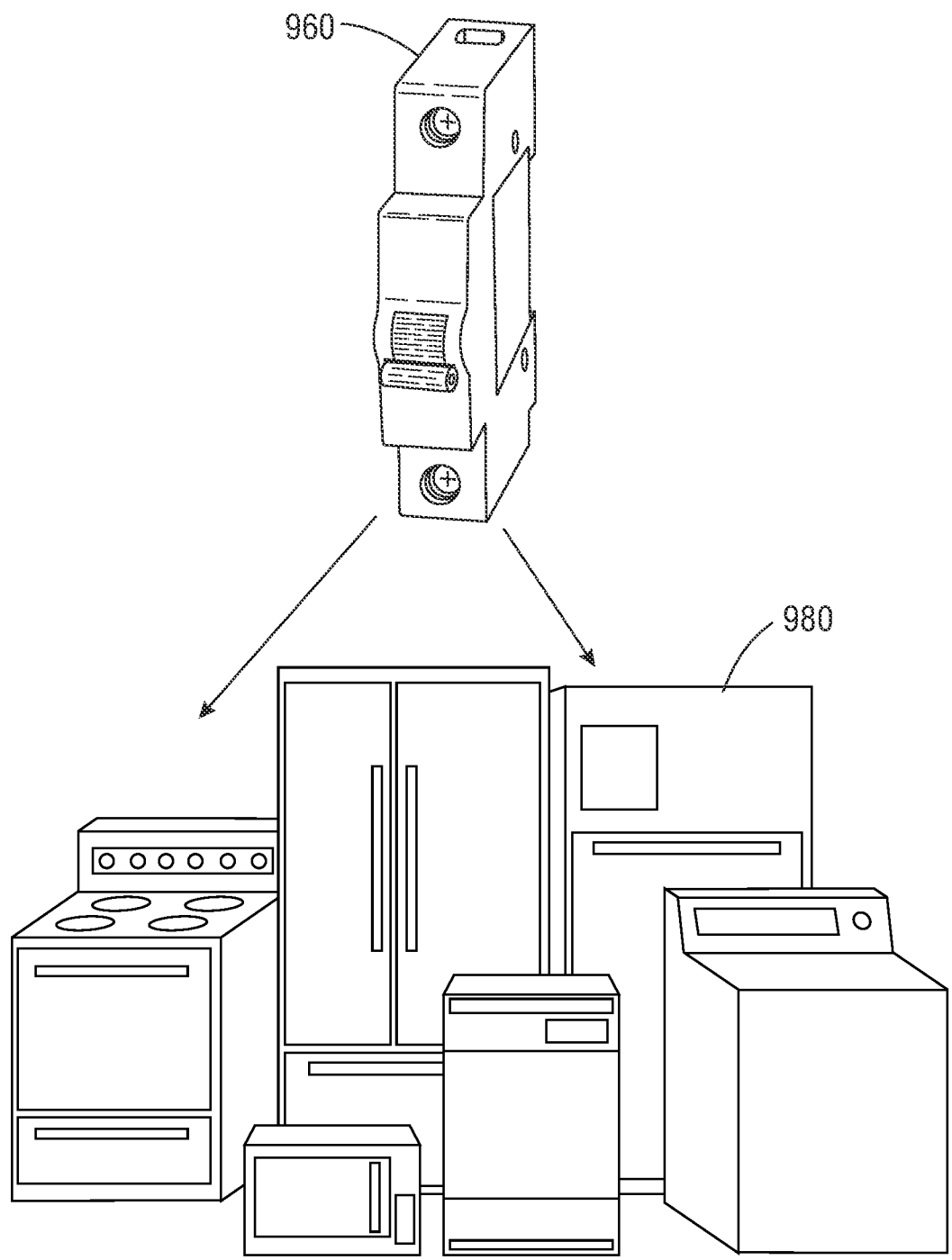
FIG. 18 is a schematic drawing showing a smart circuit breaker disconnecting user-defined high power loads.

FIG. 18 is a schematic drawing showing the role of a smart circuit breaker 960 to disconnect select high current demanding user-subscriber appliance electrical loads 980, such as ovens, refrigerators, air conditioners, microwave ovens, dishwashers, etc.

Figure 19:
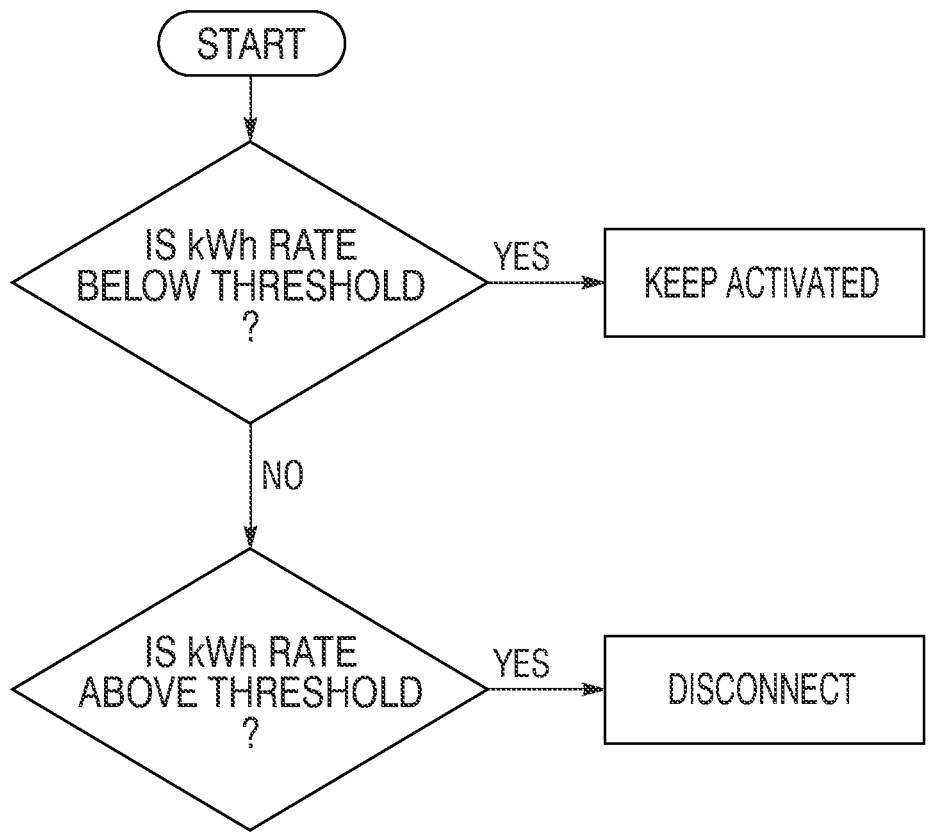
FIG. 19 is a flowchart regarding the decision process to disconnect user loads.

FIG. 19 is a simplified flowchart depicting the decision process for disconnection of an electrical load on behalf of the user-subscriber.

Figure 20:
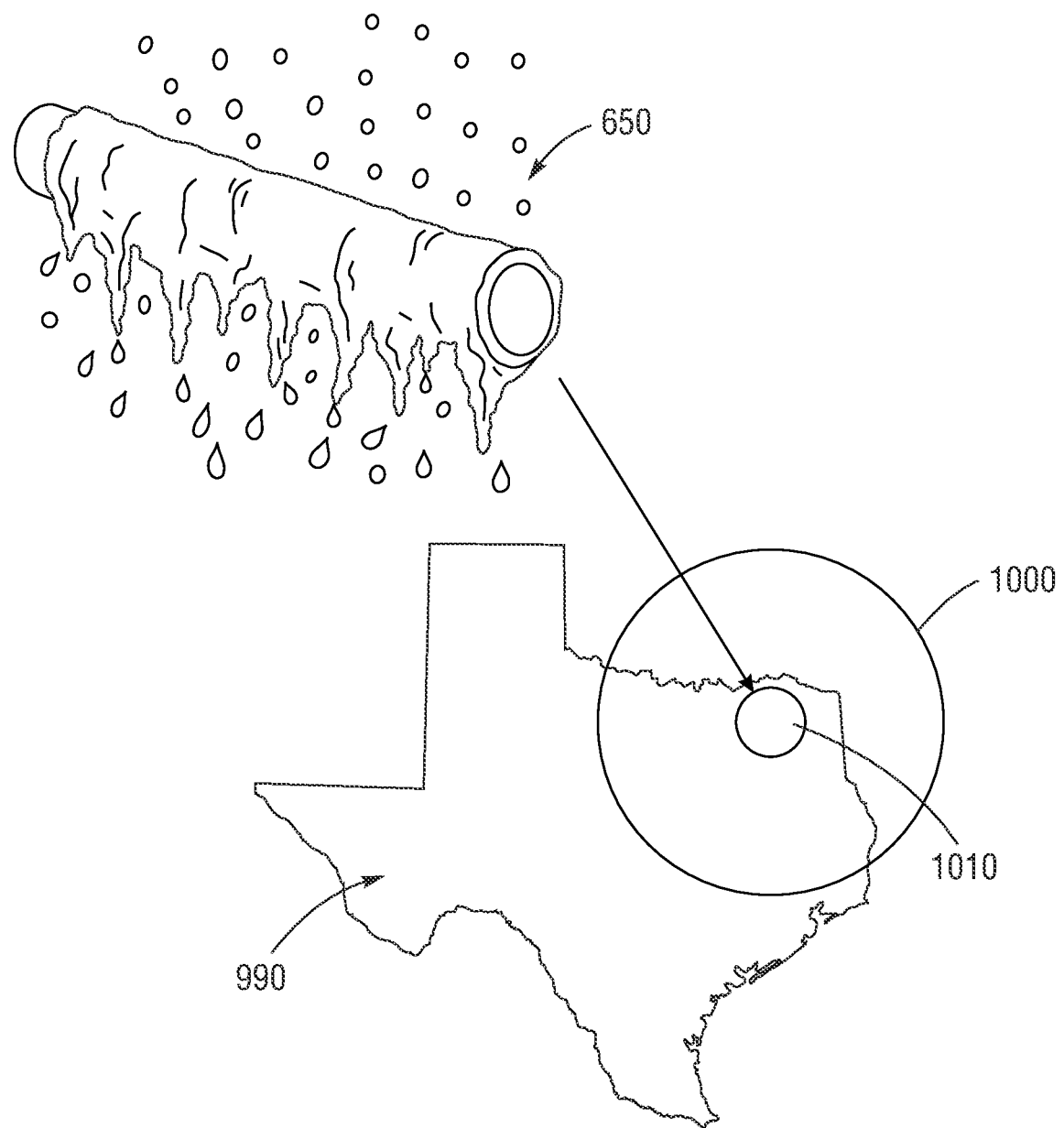
FIG. 20 is a schematic drawing showing the localization of actual or potential geographical location of powerline integrity issue.

FIG. 20 is a schematic diagram representing how the localization of an iced powerline 650 in a given region 1000 for a given state 990, has GPS coordinates for precise location 1010 identified. By identifying and reporting powerline icing data to both the utility and the user-subscribers in a given location, consumer-subscribers can take steps to plan for possible power grid disruption.

Figure 21:
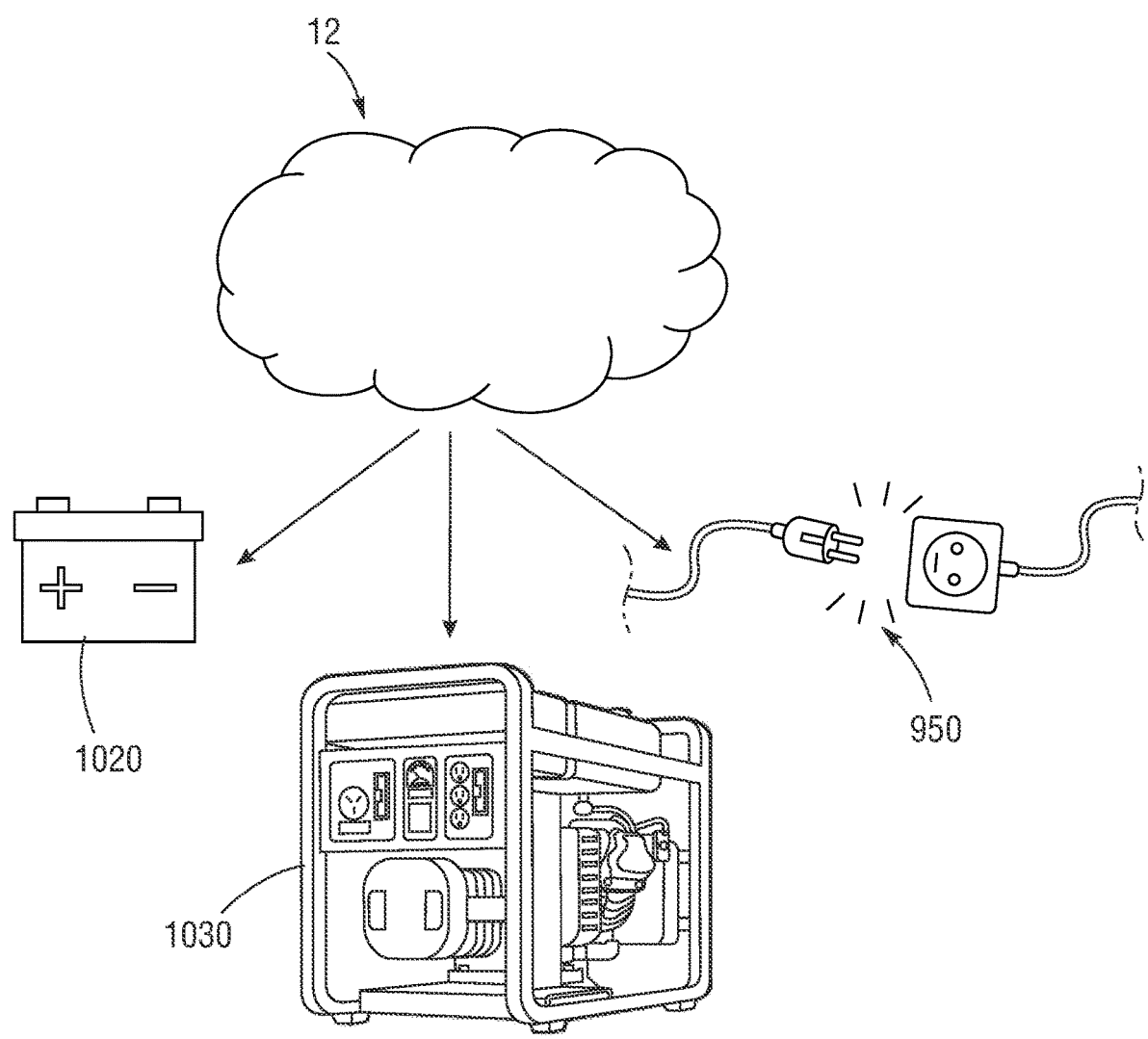
FIG. 21 is a schematic drawing showing the relationship of an embodiment of automatic functions, being to disconnect defined loads, and/or switch user loads to alternative power sources.

FIG. 21 is a schematic drawing representing the internet or intranet 12, in communication with the user-subscriber's battery backup system 1020, or electric generator 1030, and smart outlet(s) 950. In the event of a powerline outage, and actual or potential local power rate increase per kWh-hr, the user-subscriber high current loads can be disconnected via 950, and home or business power restored by connecting to a batter-AC inverter backup 1020, or a mechanical generating device 1030.

Figure 22:
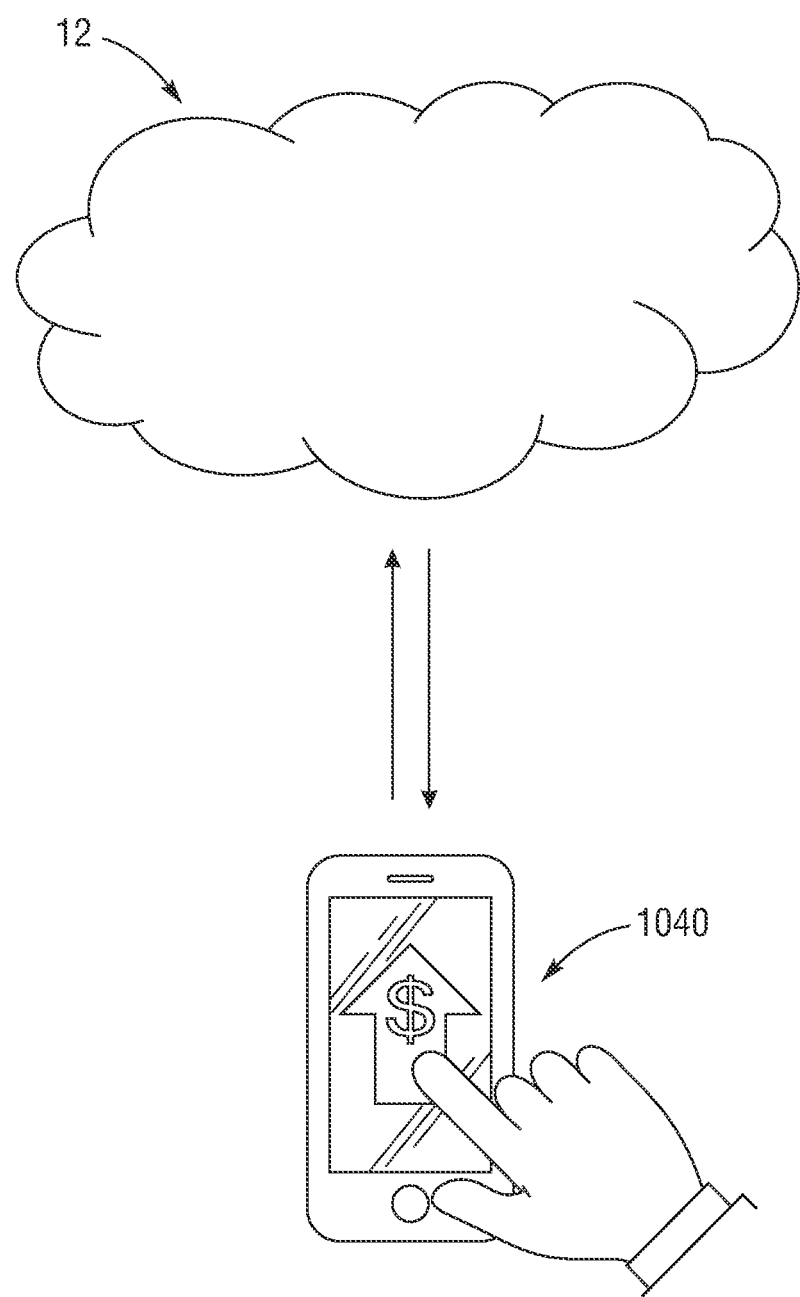
FIG. 22 is a schematic drawing representing user control of utility bill payment.

FIG. 22 is a schematic drawing representing the user-subscriber's utility customer payment control program via smart device 1040, connected to the internet or an intranet. The user-subscriber defines, in advance, what thresholds of cost of local electric rate per kWh-hr the user-subscriber wishes to have his/her home or business disconnected from the local electric grid. The user-subscriber may define that only certain loads in a home or business is disconnected, such disconnection being preferably in a step-wise fashion. That is, If electric rates were to rise, for example, 10% over the user-subscriber's preferred rate per kWh-hr, then one group of loads would be instructed to be disconnected using a smart outlet or smart circuit breaker or smart electric panel. If local electric rates exceeded, for example, 50% the user-subscriber electric rate cost per kWh-hr, a second group of loads would be disconnected via communication with a smart outlet, smart circuit breaker, or smart electric utility panel. In addition, the user-subscriber could instruct the program to switch said loads over to user-subscriber power sources such as a battery and AC inverter system or stand alone electric power generator.

Figure 23:
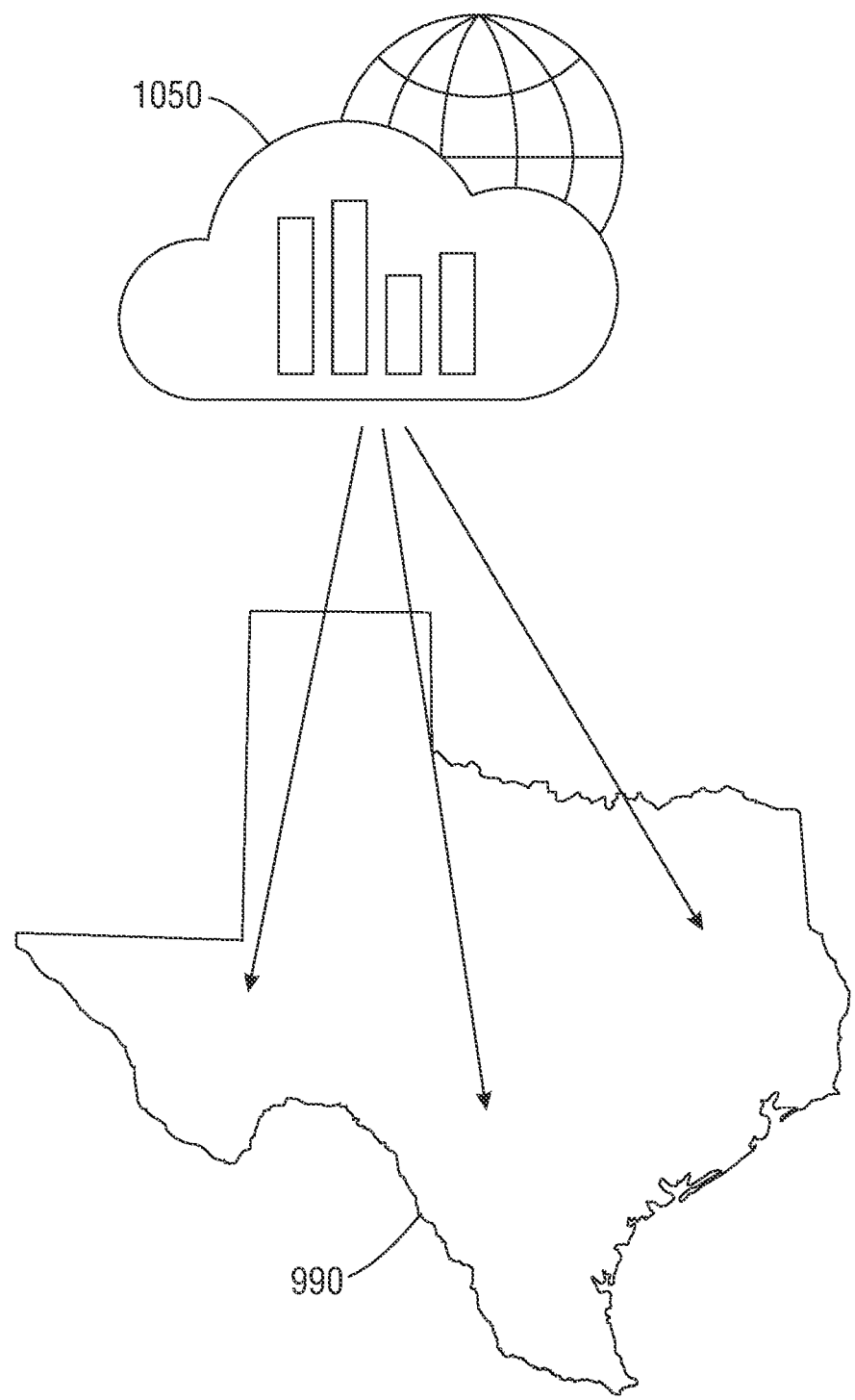
FIG. 23 is a schematic drawing showing current local electric cost data being transmitted to all user-subscribers.

FIG. 23 is a schematic drawing depicting the communication of instantaneous electric rates, wholesale or retail 1050, to the internet or an intranet, with such electric rate cost data made available throughout a given geographical region 990 of customers.

Figure 24:
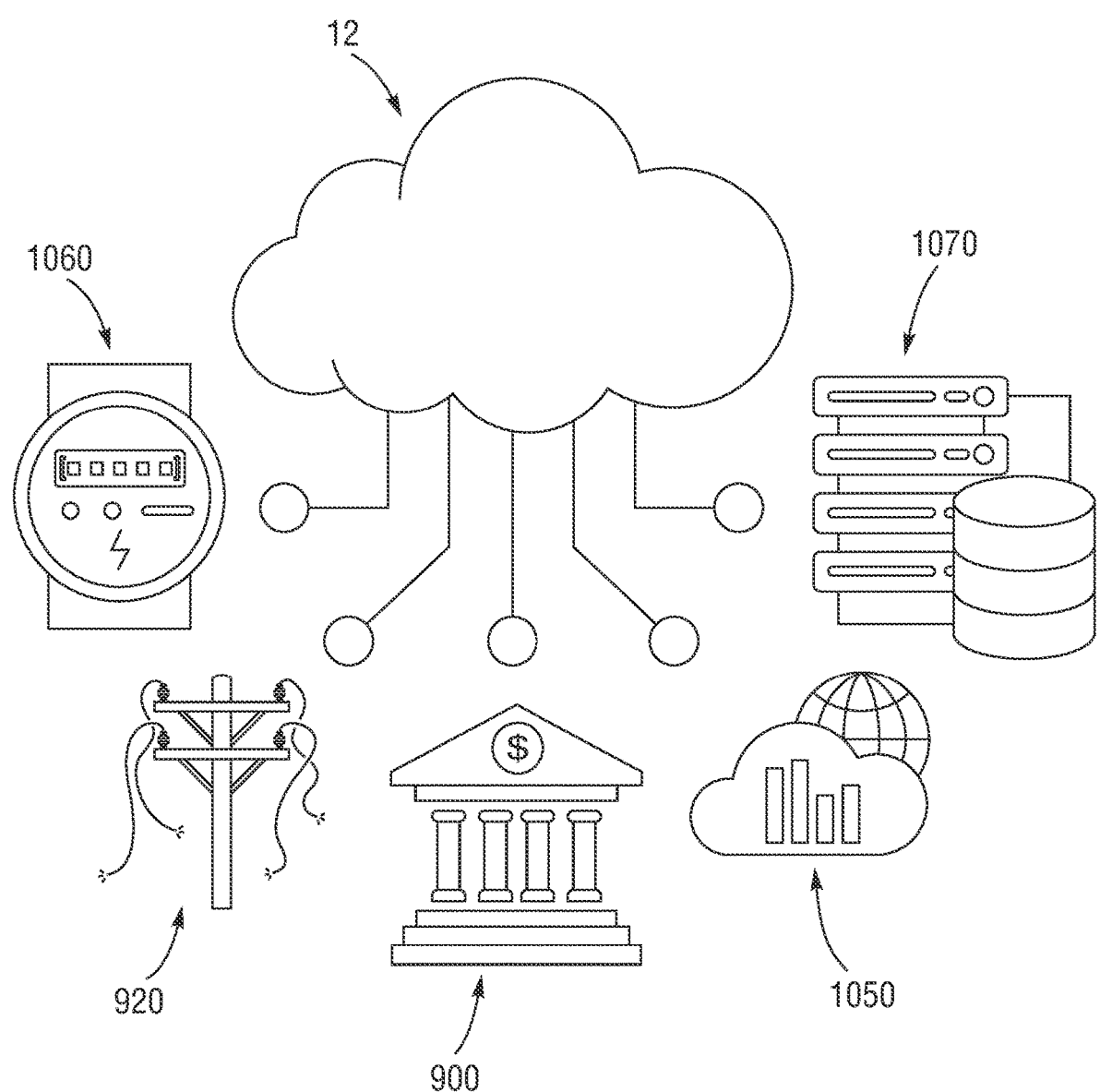
FIG. 24 is a schematic diagram showing the use of a smart meter coupled to the internet, and receiving data of line condition, cost of electricity, user payment preferences, and local computer server.

FIG. 24 is a schematic drawing representing an embodiment of data sources connected to the internet or an intranet 12, for invention operation. A smart power meter 1060 receives the electric rate data 1050 from a utility server 1070, actual powerline service interruption data 920, and based on user-subscriber preferences, specifies the amount of utility payment 900 and whether to disconnect from the regional utility grid.

Figure 25:
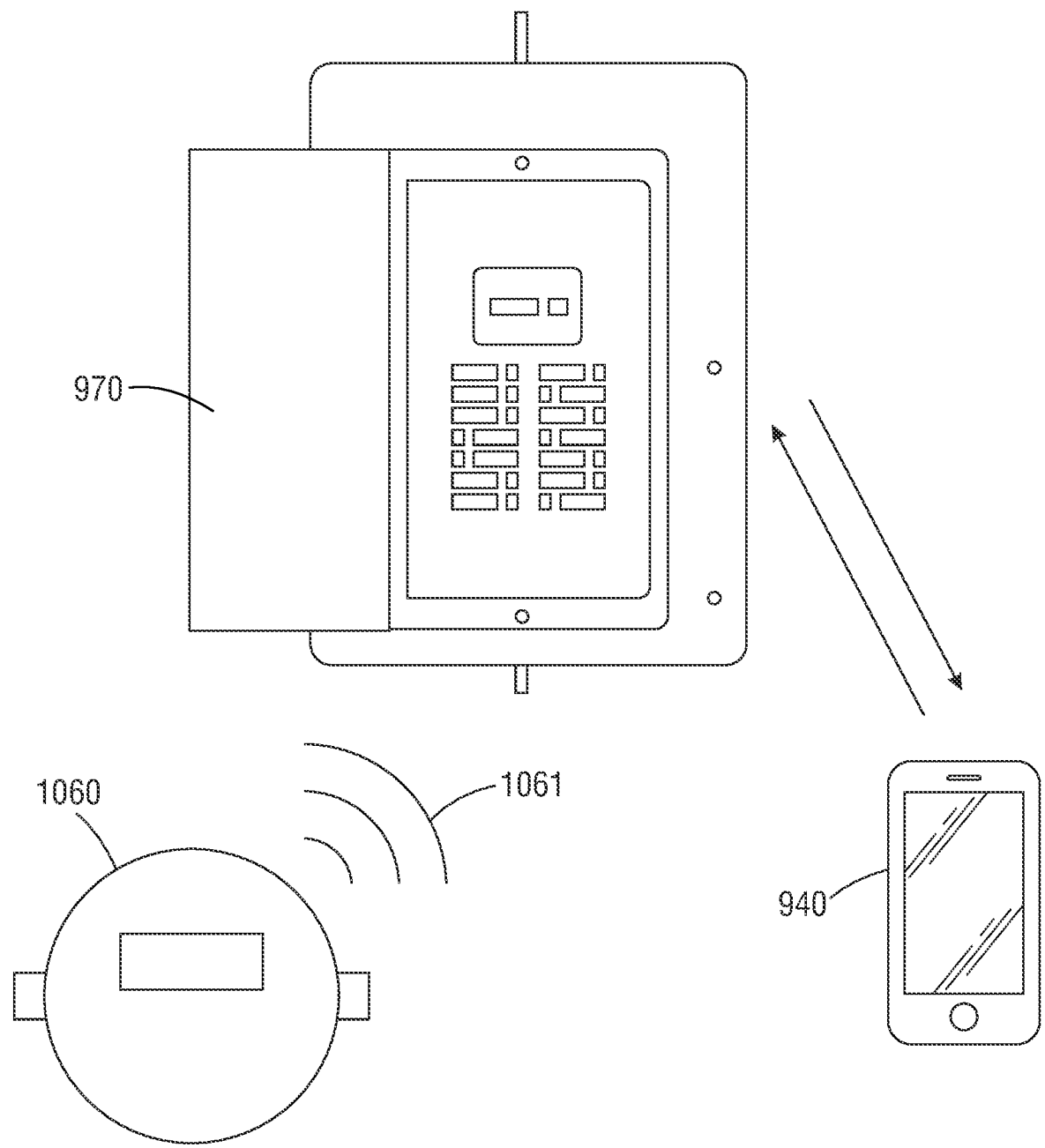
FIG. 25 is a schematic diagram illustrating the smart meter communicating with a smart utility panel and the user-subscriber's smart device or computing device.

FIG. 25 is a schematic drawing depicting another embodiment of the disclosed invention, where a smart utility box 970, is in communication with a smart utility meter 1060, and the user-subscriber's smart device or personal computing device 940.

Figure 26:
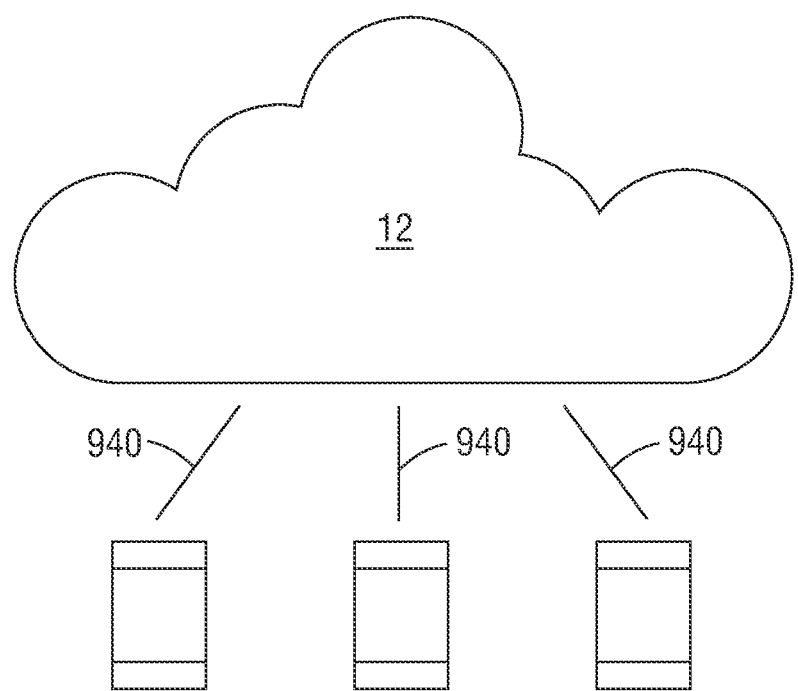
FIG. 26 is a schematic drawing of multiple user-subscribers interconnected and sharing rate and utility condition data.

FIG. 26 is a schematic drawing representing yet another embodiment of the disclosed invention where multiple user-subscribers are connected to one another using their smart device or computing devices 940 to the internet or intranet 12. The sharing of data would help users respond faster to rapidly emerging power utility conditions.

Figure 27:
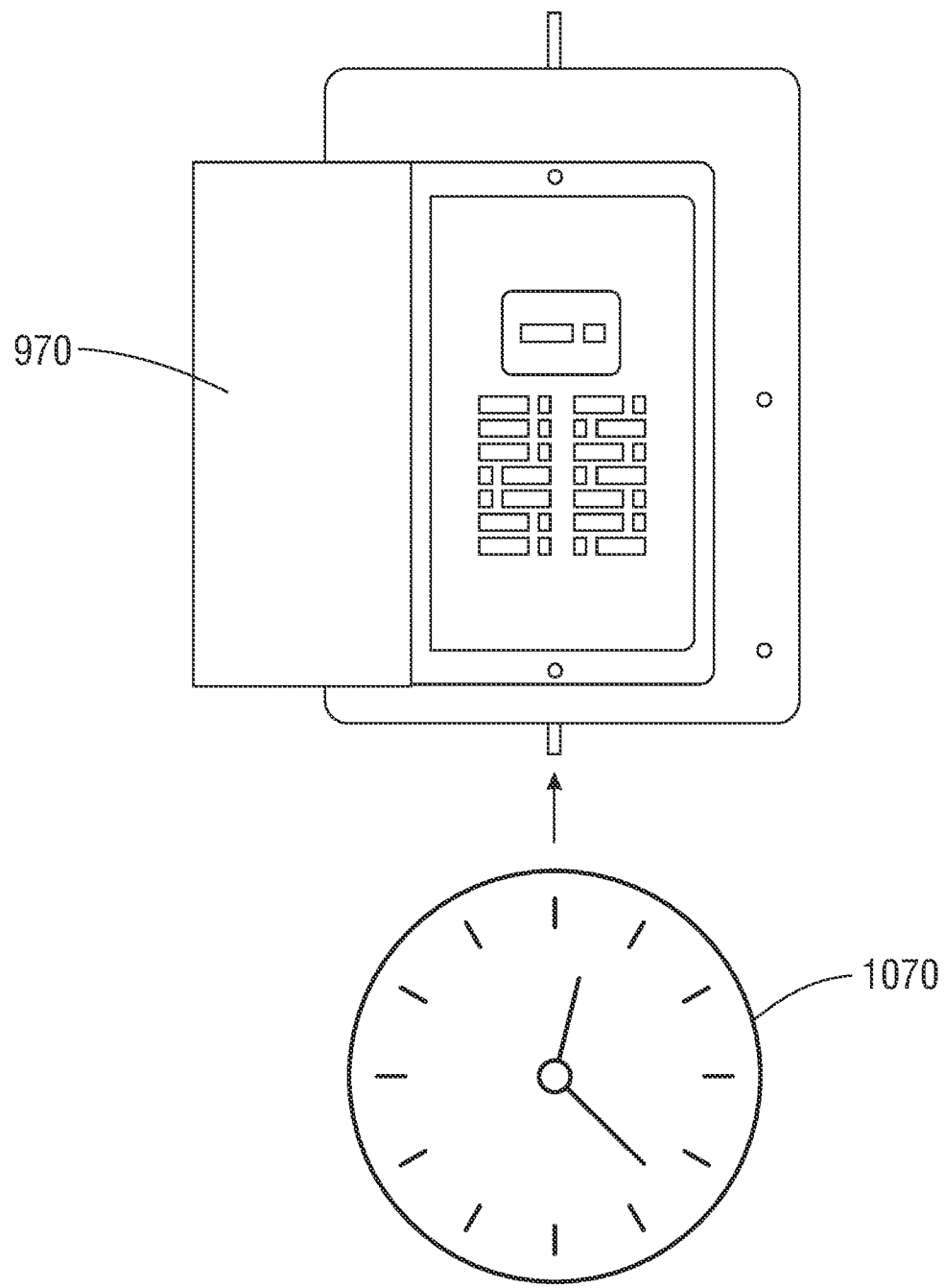
FIG. 27 is a schematic drawing representing the use of local time in communication with a smart utility panel to add or remove loads in accordance with the time of day.

FIG. 27 is a schematic drawing representing the current local time 27 and a smart utility box 970 for the user subscriber. By monitoring the local time, the user-subscriber may connect and disconnect loads based on the time of day when high demand for electricity can result in increased electric rates per kWh-hr.

Figure 28:
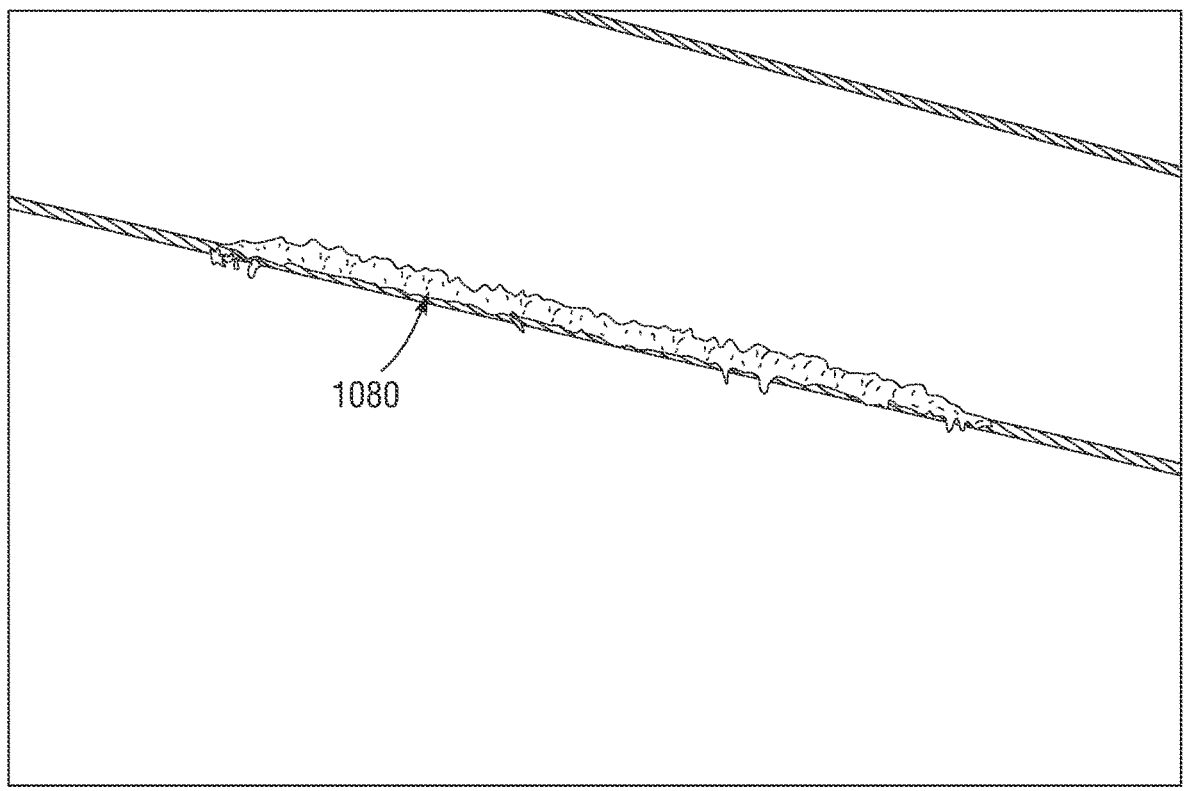
FIG. 28 is a drawing of ice encapsulating an electric power transmission line.

FIG. 28 is a drawing of ice covering a single electric transmission line.

Figure 29:
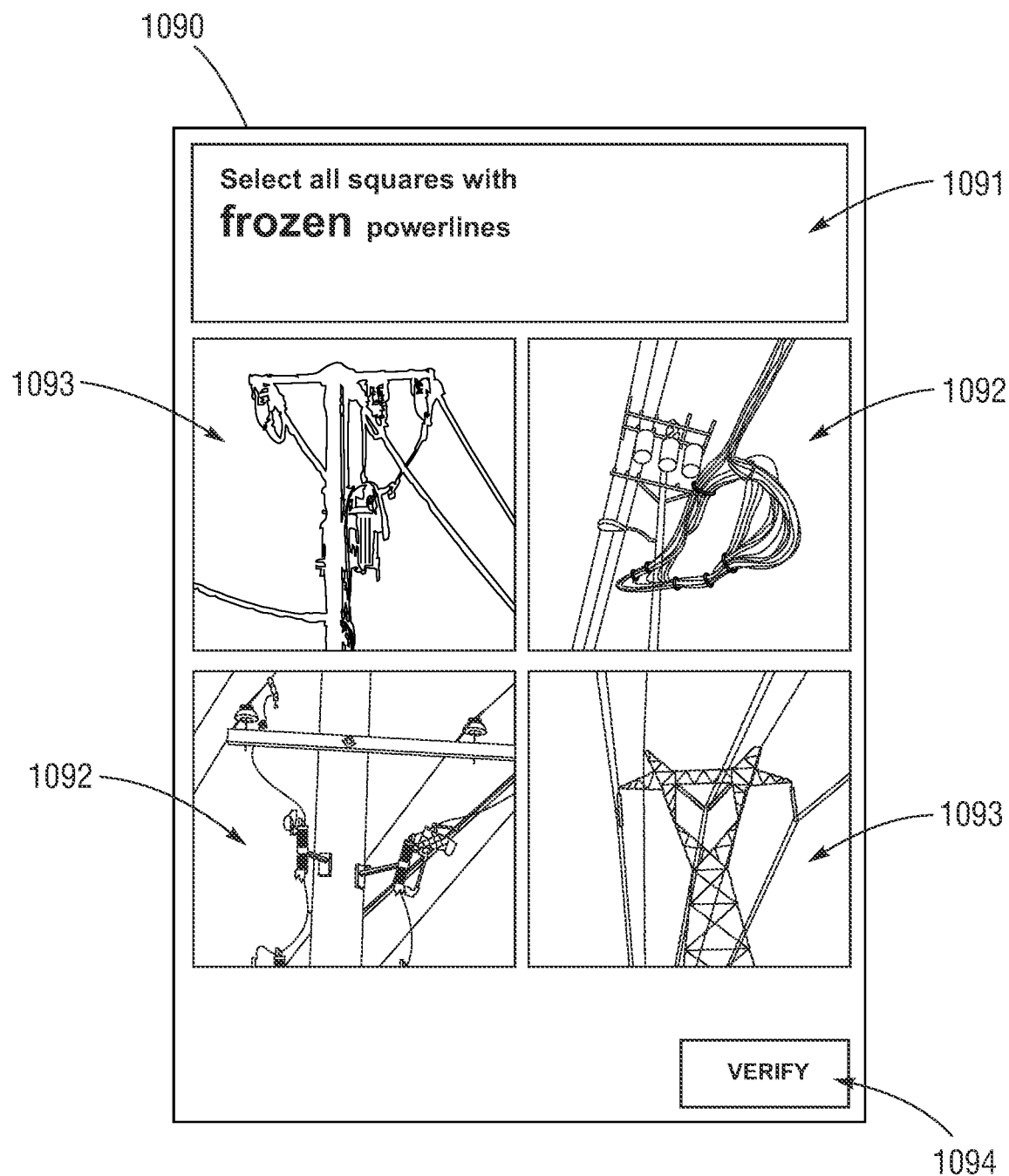
FIG. 29 is a figure illustrating a reCAPTHCA decision box to help machine vision improve in decision analysis results as to condition of an electric power transmission line.

FIG. 29 is a schematic drawing representing a reCAPTCHA decision box 1090, where machine learning for improved machine vision of what constitutes a damaged powerline as derived from an image of part of a powerline, can be enhanced over time by having select internet or other users participate based on a question, 1091, and verify 1094, what are normal power line devoid of dame 1092 verses compromised powerlines, such as those with ice covering them 1093.

Figure 30:
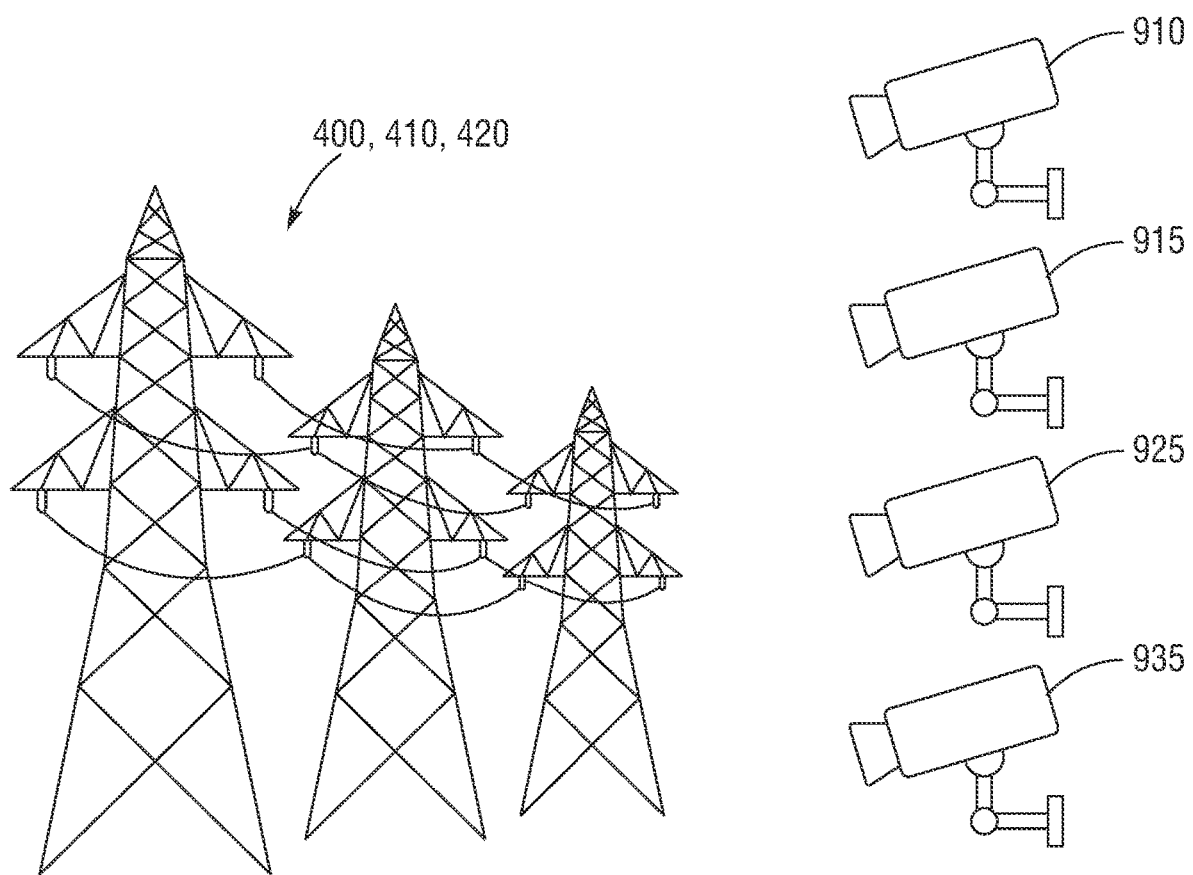
FIG. 30 is a schematic diagram representing a plurality or image capture sources used in monitoring electric power transmission line condition.

FIG. 30 is a schematic drawing representing high tension line towers 2000, which are monitored using preferably solid-state charge-coupled device (CCD) or other cameras, such camera 910 being affixed to a powerline monitor as defined in object 30, FIG. 7, or a camera attached to the transmission line structure or pole 915, or a camera affixed to a ground location 925, or a camera image data from a third party source, such as an ATM or security camera 935.

Figure 31:
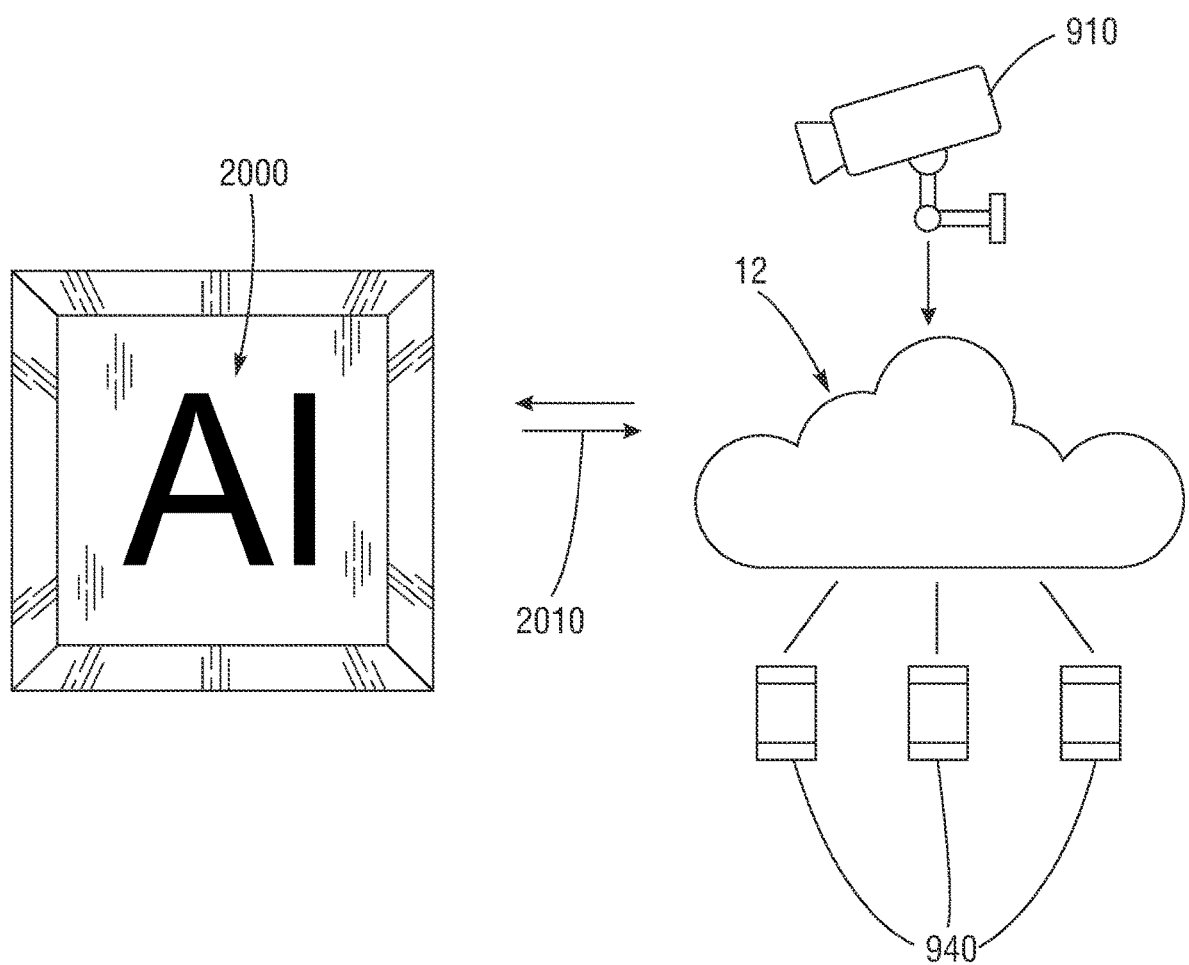
FIG. 31 is a schematic diagram representing the interaction of artificial intelligence, the cloud internet or an intranet system, and image capture camera devices, reporting electric power transmission line condition decision results to user-subscribers.

FIG. 31 is a schematic drawing depicting the relationship between the transmission line image data 910, connected via the internet or an intranet 12, with bi-directional data flow 2010 to an artificial intelligence 2000 program, which sends possible power transmission line integrity decision analysis results to individual user-scriber" smart devices or computing devices 940.

Throughout this patent application, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium. For example, a server can include one or more computers operating as a web server, database server, or other type of computer server in a manner to fulfill described roles, responsibilities, or functions. Within the context of this document, the disclosed smart assistants, smart phones, tablets, or hand held computers are also deemed to comprise computing devices having a processor and a non-transitory memory storing instructions executable by the processor that cause the device to control, manage, or otherwise manipulate the features of the disclosed apparatuses, systems and methods.

REFERENCE NUMERALS

FIG. 1:
  10 A commercially available home voice activated digital assistant such as an Amazon Alexa.
  20 power source for the voice activated digital assistant.

FIG. 2:
  50 A commercially available home voice activated digital assistant such as an Amazon Dot.

FIG. 3:
100 A road or street that connects to each homes driveway.
110 A residential home.
120 A plurality of trees.
FIG. 4:
100 A road or street that may connect to each home's driveway.
110 A residential home.
120 A plurality of trees.
130 A fire.
140 Smoke.
FIG. 5:
200 A road or street that may connect to each home's driveway.
210 A residential home.
220 A plurality of trees.
FIG. 6:
200 A road or street that may connect to each home's driveway.
210 A residential home.
220 A plurality of trees.
230 A wildfire.
240 A dashed line surrounding the homes that are in the most immediate danger from the wildfire.
250 A dashed line surrounding the homes that are in the less danger from the wildfire because they are further from the wildfire.
FIG. 7:
300 A clamshell housing.
301 A power transmission line monitor.
310 At least one latch that holds the clamshell type, clamp-on power line monitor closed and fixed to the power line.
320 At least one latch that holds the clamshell type, clamp-on power line monitor closed and fixed to the power line.
330 An LED used to indicate the status of the power line monitor.
340 An LED used to indicate the status of the power line monitor.
350 An LED used to indicate the status of the power line monitor.
360 A power line.
FIG. 8:
400 A power line.
410 A power line.
420 A power line.
430 A clamshell type, clamp-on power line monitor.
440 A clamshell type, clamp-on power line monitor.
450 A clamshell type, clamp-on power line monitor.
FIG. 9:
400 A power line.
410 A power line.
420 A power line.
430 A clamshell type, clamp-on power line monitor.
440 A clamshell type, clamp-on power line monitor.
450 A clamshell type, clamp-on power line monitor.
500 A utility pole used to support the power lines.
510 A road.
FIG. 10:
400 A power line.
410 A power line.
420 A power line.
430 A clamshell type, clamp-on power line monitor.
440 A clamshell type, clamp-on power line monitor.
450 A clamshell type, clamp-on power line monitor.
500 A utility pole used to support the power lines.
510 A road.
600 A wildfire.
FIG. 11:
400 A power line.
410 A power line.
420 A power line.
430 A clamshell type, clamp-on power line monitor.
440 A clamshell type, clamp-on power line monitor.
450 A clamshell type, clamp-on power line monitor.
500 A utility pole used to support the power lines.
510 A road.
650 A powerline icing condition.
FIG. 12:
700 A user who is near a voice activated digital assistant.
705 A cloud computing services for the voice activated digital assistant.
710 A cloud computing services for a power line monitor.
715 A communication link between different cloud computing services.
720 A communication link between a voice activated digital assistant and the AVS.
725 A communication link between a power line monitor and its cloud service.
730 A power line.
735 A power line monitor.
740 A voice activated digital assistant.
745 Audio produced by the voice activated digital assistant.
FIG. 13:
10 A digital assistant.
12 A network.
14 A cloud computing service.
16 A remote server.
301 A power transmission line monitor.
360 A power transmission line.
FIG. 14:
800 A flowchart block that represents a process that configures the digital assistant.
804 A flowchart block that represents a process that configures the digital assistant with a cloud computing system.
808 A flowchart block that represents a process that configures the digital assistant with a remote server.
812 A flowchart block that represents a process that configures the digital assistant with a power line monitor.
816 A flowchart block that represents reception of an emergency event from a power line monitor to the digital assistant.
820 A flowchart block that represents a process where the digital assistant produces an audible alert.
FIG. 15:
824 A flowchart block that represents a process that configures the digital assistant to communicate with a network.
828 A flowchart block that represents a process that configures the digital assistant with a remote server.
832 A flowchart block that represents a process that configures the digital assistant with a cloud computing system.
836 A flowchart block that represents a process that configures the power line monitor to be in communication with a digital assistant.
840 A flowchart block that represents a process that enables a power line monitor a plurality of power line conditions.

844 A flowchart block that represents a process where the power line monitor produces an audible and visual alert.
848 A flowchart block that represents a process where the power line monitor produces rapid pulses of light from the LEDs to indicate the status of the power line monitor.
FIG. 16:
12 Internet or intranet cloud.
650 A fire.
900 Financial institution for consumer-subscriber.
910 A camera mounted and in communication with line sensor 301 in FIG. 7.
930 Icing condition on powerline.
920 Downed powerline as determined by powerline sensor 301 in FIG. 7.
FIG. 17:
12 Internet or intranet cloud.
940 Smart device such as iPhone, iPad, personal computer, or other computing device.
950 Smart electrical outlet.
960 Smart circuit breaker.
970 Smart electrical utility box.
FIG. 18
960 Smart circuit breaker.
980 Appliances.
FIG. 19
Flowchart of electric load disconnection logic.
FIG. 20
650 Image of powerline covered in ice.
990 Geographical location of powerline monitoring.
1000 Region of potential powerline failure.
1010 Region of actual powerline failure.
FIG. 21
12 Internet or intranet cloud connection.
950 Smart electrical outlet.
1020 Battery backup system with AC inverter.
1030 Electric backup generator.
FIG. 22
12 Internet or intranet cloud connection.
1040 Consumer utility customer payment control program via smart device.
FIG. 23
990 Geographical location of powerline monitoring.
1050 Cost of regional electric power per kWh-hr.
FIG. 24
12 Internet or intranet.
900 Financial institution of consumer-subscriber.
920 Downed powerline.
1050 The present cost per kilowatt-hr of electricity for the consumer-subscriber.
1060 Smart power meter for user-subscriber.
1070 Computer mainframe or server.
FIG. 25
940 Smart device such as iPhone, iPad, personal computer, or other computing device.
970 Smart electrical utility box.
1060 Smart power meter for user-subscriber.
1061 Telemetry between consumer-subscriber smart power meter and user-subscriber smart breaker panel.
FIG. 26
12 Internet or intranet.
940 Smart device such as iPhone, iPad, personal computer, or other computing device.
FIG. 27
970 Smart electrical utility box.
1070 Local time.
FIG. 28
1080 Ice covering electric power line.
FIG. 29
1090 reCAPTCHA decision box.
1091 User task box.
1092 Normal powerline, no ice.
1093 Iced powerline.
1094 User verify button.
FIG. 30
400, 410, 420 Powerline transmission line(s).
910 Camera affixed to, and in communication with, powerline monitor as depicted as 30 in FIG. 7.
915 Camera affixed to utility pole.
925 Camera affixed to ground location.
935 Camera from third party source.
FIG. 31
12 Internet or intranet.
910 A camera mounted and in communication with line sensor 301 in FIG. 7.
940 Smart device such as iPhone, iPad, personal computer, or other computing device.
2000 Computer program for artificial intelligence.
2010 Bidirectional data flow in communication with internet or intranet connection to powerline image monitoring system.

The disclosed system for geolocation awareness for voice activated digital assistants system and apparatus has many advantages. The system allows utility companies to save time, money and resources by pinpointing where problem power transmission lines are. The system provides warnings to owners of voice activated digital assistants of emergency events, such as fires, earth quakes, explosions, damaged power lines, power outages, extreme wind warnings, ice warnings, etc. The disclosed invention for geolocation of power outages or for the potential for a power outage affords the consumer the ability to take preventative steps to disconnect electric load(s) to mitigate or eliminate electric bills above a predefined threshold, or to switch such loads to an alternate power source.

It should be noted that the term user-subscriber, consumer-user, utility customer, all refers to the end user electric customer.

In summation, the disclosed invention provides power line condition or status data to the user subscriber such that actual electric cost at a given predefined moment in time, is presented to a smart utility box or computing device such that, user-subscriber commands to disconnect the user-subscriber from the utility grid may be performed. In addition, smart assistant may provide the user-subscriber verbal or other warning concerning actual local power grid infrastructure damage, or imminent system damage. In an embodiment, user-subscriber loads are removed incrementally based on actual or projected power electric rate cost, with the user-subscriber option of having said loads transferred, in whole or in part, to an alternate electric power source, such as a battery, generator, or other power source.

In addition, in an embodiment, the potential for local power grid failure is ascertained using machine vision, and deep learning artificial intelligence (AI) based on actual powerline images captured by a plurality of cameras seeded throughout the system and via third party sources. The machine vision and artificial intelligence is continuously improved through the employment of a public or private or both, reCAPTCHA system to help the AI software "learn" what appears damaged and what does not.

The complexities inherent in the wide variety of morphological variations in what is a potential state for failure of a powerline, such as an icing condition, is challenging, necessitating trained human interface. Borrowing from techniques used in cyber security, machine learning is possible that can enhance the decision matrix. What does cyber security have to do with identification of icing of a powerline by visual means? At first glance it might appear that the two have nothing to do with each other. Upon closer examination; however, the two are in fact related.

With the advent of present internet linked computer platforms, there are those who wish to circumvent cyber security so they can take advantage of unsuspecting individuals. As anyone who has ever purchased concert tickets or signed up for an account on a website, they have undoubtedly encountered a challenge response test known as a CAPTCHA. The CAPTCHA is an image that displays two distorted words or numbers. The goal of the CAPTCHA is to allow the website to verify that the information being entered is being entered by a human and not a computer or "bot".

The term CAPTCHA is an acronym that means
Completely
Automated
Public
Turing test to tell
Computers and
Humans
Apart There have been people who utilize computers to buy up large blocks of concert or theater tickets, only to later resell them at a higher price. Hackers have used computers or bots to log onto e-mail servers to create many fake e-mail accounts that would later be used to create fake Facebook, Twitter, or Instagram accounts and also to stop spam. To thwart such web site attacks by bots, CAPTCHA has been devised to help distinguish between a real person and an automated bot.

The late mathematician and computer scientist Alan Turing often mused about computers someday becoming sufficiently intelligent where they might be able to fool humans into thinking that a computer is actually a human. In one thought experiment, Alan Turing supposed an "imitation game" played by three people, a man (A), a woman (B) and an interrogator (C) who may be of either sex. The interrogator is located in a room apart from the other two were communication through a series of typewritten questions is permitted so as not to give away information related to the persons gender and has to determine the gender of each person.

Turing supposed that if a sufficiently well programmed computer takes the place of either "A" or "B", it would be difficult, if not impossible for the interrogator to deduce their gender. The theory behind the CAPTCHA is that humans are very good at discerning patterns and optical character recognition while contemporary computers are not as good as humans. If the web site showed two known words that are visually distorted, a human would have a much easier time deciphering what the word is than would a computer, or more specifically, an optical character recognition (OCR) program.

By creating a reCAPTCHA box where normal, damaged, and potential for damage powerline are shown, human users may select those images that meet the question posed by the test, and in doing so, provide input data to the AI to image the AI decision making matrix process.

Overall, the disclosed invention offers the user-subscriber a means to be continuously informed using digital assistants and smart devices and computing systems, of any conditions that may affect the user-subscribers electric service integrity and electric service cost. Most importantly, the disclosed invention provides the user subscriber the means to control electric rate bill costs dynamically according to the customer's predefined wishes.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A system for localized subscriber control of electric provider billing comprising:
   a digital assistant in communication with powerline sensors, the powerline sensors configured to detect weather, natural disaster, or other event that compromises the electric grid in a given predetermined region,
   a smart utility box in operational communication with a subscriber's utility connection and in communication with the digital assistant, wherein the smart utility box is configured to disconnect from a utility and stop incurring charges from the utility if the smart utility box determines that utility prices may exceed a threshold value; and
   a system of networked cameras, attached to the powerline sensors, where camera data about powerlines and local events that affect or may affect powerline infrastructure, can be connected to a central server.

2. The system of claim 1, further comprising:
   a system by which the subscriber can interact with the smart device application to receive wholesale and retail electric rate costs for a prescribed electric grid region.

3. A system for localized subscriber control of electric provider billing comprising,
   a digital assistant in communication with powerline sensors, the powerline sensors configured to detect weather, natural disaster, or other event that compromises the electric grid in a given predetermined region,
   a smart utility box in operational communication with a subscriber's utility connection and in communication with the digital assistant, wherein the smart utility box is configured to disconnect from a utility and stop incurring charges from the utility if the smart utility box determines that utility prices may exceed a threshold value; and
   an application on the digital assistant configured to allow a subscriber to set a predetermined threshold value such that if electric rates exceed said threshold value, various loads in the subscriber home are disconnected in accordance with the level of electric rate increase.

4. The system of claim 3, wherein the subscriber is notified when and what loads will be removed.

5. The system of claim 3, where the load disconnected from the electric grid may be switched to a backup source of electricity, such as a home generator, battery, or renewable source of power.

* * * * *